US012067618B2

(12) United States Patent
Creamer et al.

(10) Patent No.: US 12,067,618 B2
(45) Date of Patent: Aug. 20, 2024

(54) FILTER COMPONENT FOR AUTOMATICALLY TRIGGERING ACTIONS BASED ON EVENTS IN TRADING INFORMATION

(71) Applicant: Geneva Technologies, LLC, Chicago, IL (US)

(72) Inventors: Robert S. Creamer, Chicago, IL (US); Edward Paul Krauss, Chicago, IL (US); Geoffrey R. Myers, Jr., Wilmette, IL (US)

(73) Assignee: Geneva Technologies, LLC, Chicago, IL (US)

( * ) Notice: Subject to any disclaimer, the term of this patent is extended or adjusted under 35 U.S.C. 154(b) by 206 days.

(21) Appl. No.: 17/174,556

(22) Filed: Feb. 12, 2021

(65) Prior Publication Data

US 2021/0233172 A1    Jul. 29, 2021

Related U.S. Application Data

(60) Continuation of application No. 16/835,125, filed on Mar. 30, 2020, now Pat. No. 10,922,753, which is a
(Continued)

(51) Int. Cl.
*G06Q 40/04* (2012.01)
*G06F 3/0488* (2022.01)
*G06T 19/20* (2011.01)

(52) U.S. Cl.
CPC .......... *G06Q 40/04* (2013.01); *G06F 3/0488* (2013.01); *G06T 19/20* (2013.01)

(58) Field of Classification Search
None
See application file for complete search history.

(56) References Cited

U.S. PATENT DOCUMENTS 6,766,207 B2   7/2004  Sato et al.
6,766,304 B2   7/2004  Kemp, II et al.
(Continued)

FOREIGN PATENT DOCUMENTS

EP      1904966      4/2008
GB      2395819 A    6/2004
WO      2007011517 A3  7/2007

OTHER PUBLICATIONS

White, Ron. "How Computers Work, 9th Edition," Que, Indianapolis, IN, published Nov. 14, 2007, 465 pages.
(Continued)

*Primary Examiner* — Matthew S Gart
*Assistant Examiner* — Liz P Nguyen
(74) *Attorney, Agent, or Firm* — Perkins Coie LLP

(57) ABSTRACT

Methods and systems are disclosed for automatically taking actions based on triggering events in market data using a filter component are disclosed. Market trading information is received, including one or more bids and one or more asks. An untriggered virtual order is received via a filter component of a graphical user interface (GUI), including a triggering event and associated action. Upon detecting, in the market trading information, an occurrence of the triggering event, the associated action is triggered. The action can include generating an alert and/or submitting an order to a marketplace based on the untriggered virtual order. In some implementations, the filter component can display a filtered portion of the market trading information, and an untriggered virtual order can be configured via the filter component by selecting a bid or ask.

20 Claims, 17 Drawing Sheets

Related U.S. Application Data continuation of application No. 15/464,128, filed on Mar. 20, 2017, now Pat. No. 10,607,290, which is a division of application No. 13/463,753, filed on May 3, 2012, now Pat. No. 9,600,843.

(56) References Cited

U.S. PATENT DOCUMENTS

| | | | |
|---|---|---|---|
| 6,772,122 | B2 | 8/2004 | Jowitt et al. |
| 6,772,132 | B1 | 8/2004 | Kemp, II et al. |
| 7,107,226 | B1 | 6/2006 | Cassidy et al. |
| 7,113,924 | B2 | 9/2006 | Fishbain |
| 7,117,182 | B2 | 10/2006 | Chess et al. |
| 7,127,424 | B2 | 10/2006 | Kemp, II et al. |
| 7,212,999 | B2 | 5/2007 | Friesen et al. |
| 7,228,289 | B2 * | 6/2007 | Brumfield ............... G06Q 40/04 705/37 |
| 7,389,258 | B2 | 6/2008 | Brumfield et al. |
| 7,412,416 | B2 | 8/2008 | Friesen et al. |
| 7,418,422 | B2 | 8/2008 | Burns |
| 7,533,056 | B2 | 5/2009 | Friesen et al. |
| 7,630,986 | B1 | 12/2009 | Herz et al. |
| 7,685,024 | B2 | 3/2010 | Ofer et al. |
| 7,870,059 | B2 | 1/2011 | Shapiro et al. |
| 7,890,396 | B2 | 2/2011 | Weinstein |
| 8,170,940 | B2 | 5/2012 | Tully |
| 8,175,955 | B2 | 5/2012 | Friesen et al. |
| 8,190,501 | B2 | 5/2012 | Kemp, II et al. |
| 8,296,221 | B1 | 10/2012 | Waelbroeck |
| 9,600,843 | B2 | 3/2017 | Creamer et al. |
| 10,204,379 | B2 | 2/2019 | Creamer |
| 10,607,290 | B2 | 3/2020 | Creamer et al. |
| 10,909,626 | B2 | 2/2021 | Creamer |
| 10,922,753 | B2 | 2/2021 | Creamer et al. |
| 11,263,603 | B1 | 3/2022 | Dhodapkar |
| 11,308,560 | B2 | 4/2022 | Creamer |
| 11,373,244 | B2 | 6/2022 | Nadler |
| 11,593,883 | B2 | 2/2023 | Creamer et al. |
| 2002/0143690 | A1 | 10/2002 | Mahajan et al. |
| 2003/0033212 | A1 | 2/2003 | Sandhu |
| 2003/0055664 | A1 | 3/2003 | Suri |
| 2003/0088495 | A1 | 5/2003 | Gilbert et al. |
| 2004/0073496 | A1 | 4/2004 | Cohen |
| 2005/0027622 | A1 | 2/2005 | Walker et al. |
| 2005/0149429 | A1 | 7/2005 | Kemp et al. |
| 2006/0106707 | A1 | 5/2006 | Shetty et al. |
| 2007/0083452 | A1 | 4/2007 | Mayle |
| 2007/0111777 | A1 | 5/2007 | Amaitis et al. |
| 2007/0179876 | A1 | 8/2007 | Stark |
| 2007/0265954 | A1 | 11/2007 | Mather |
| 2008/0177994 | A1 | 7/2008 | Mayer |
| 2008/0183639 | A1 | 7/2008 | DiSalvo |
| 2008/0249956 | A1 | 10/2008 | Connors |
| 2008/0288889 | A1 | 11/2008 | Hunt |
| 2009/0043664 | A1 * | 2/2009 | Lutnick ................ G06Q 30/08 705/26.4 |
| 2009/0177543 | A1 * | 7/2009 | Ram ..................... G06F 3/0482 705/37 |
| 2009/0234710 | A1 | 9/2009 | Belgaied Hassine et al. |
| 2010/0049535 | A1 | 2/2010 | Chari et al. |
| 2010/0057627 | A1 | 3/2010 | Lutnick |
| 2010/0198661 | A1 | 8/2010 | McMurray et al. |
| 2010/0235273 | A1 | 9/2010 | Friesen et al. |
| 2010/0268634 | A1 | 10/2010 | Mackey, Jr. et al. |
| 2010/0293110 | A1 | 11/2010 | Rosenthal |
| 2010/0318458 | A1 | 12/2010 | West |
| 2011/0040669 | A1 | 2/2011 | Lee et al. |
| 2011/0161222 | A1 | 6/2011 | Shapiro et al. |
| 2011/0258036 | A1 | 10/2011 | Ioffe et al. |
| 2011/0264579 | A1 | 10/2011 | Kline et al. |
| 2012/0047060 | A1 | 2/2012 | Fossler, II |
| 2012/0084190 | A1 | 4/2012 | Messina et al. |
| 2012/0150713 | A1 | 6/2012 | Russel et al. |
| 2012/0317053 | A1 | 12/2012 | Gartland et al. |
| 2013/0054439 | A1 | 2/2013 | Zhao et al. |
| 2013/0060671 | A1 | 3/2013 | Lawrence |
| 2013/0097664 | A1 | 4/2013 | Herz |
| 2013/0117198 | A1 | 5/2013 | Hogan |
| 2013/0297474 | A1 | 11/2013 | Creamer et al. |
| 2013/0317961 | A1 | 11/2013 | Malatesta |
| 2014/0095365 | A1 | 4/2014 | Potekhina et al. |
| 2014/0279344 | A1 | 9/2014 | Creamer et al. |
| 2014/0279345 | A1 | 9/2014 | Burns et al. |
| 2014/0344186 | A1 | 11/2014 | Nadler |
| 2015/0081505 | A1 | 3/2015 | Co et al. |
| 2016/0063623 | A1 | 3/2016 | Rooney et al. |
| 2016/0132966 | A1 | 5/2016 | Creamer et al. |
| 2016/0350855 | A1 | 12/2016 | Lerner |
| 2017/0236204 | A1 | 8/2017 | Creamer et al. |
| 2019/0121338 | A1 | 4/2019 | Celia |
| 2019/0172144 | A1 | 6/2019 | Creamer |
| 2019/0205982 | A1 | 7/2019 | Creamer et al. |
| 2019/0324444 | A1 | 10/2019 | Celia |
| 2020/0151815 | A1 | 5/2020 | Whitfield |
| 2020/0364790 | A1 | 11/2020 | Creamer et al. |
| 2021/0182882 | A1 | 6/2021 | Mitchell |
| 2021/0357772 | A1 | 11/2021 | Egorov |
| 2022/0237702 | A1 | 7/2022 | Creamer |

OTHER PUBLICATIONS

"Sorenson, Eugene, and Richard Brath. "Financial visualization case study: Correlating financial timeseries and discrete events to support investment decisions." In 2013 17th International Conference on Information Visualisation, pp. 232-238. IEEE, 2013."

Hochheiser, Harry et al. "Dynamic query tools for time series data sets: timebox widgets for interactive exploration." Information Visualization 3, 2004: 1-18.

Nousi, Paraskevi et al. "Machine Learning for Forecasting Mid-Price Movements Using Limit Order Book Data." IEEE Access 7, May 2019, pp. 64722-64736.

Roberts, Pasha. "Information Visualization of the Stock Market Ticks: Toward a New Trading Interface." Thesis, Massachusetts Institute of Technology, 2003, 83 pages.

Sastry, Lakshmi. "User Interface Management Systems for Engineering Applications." Computer Graphics forum, vol. 11, No. 2. Edinburgh, UK: Blackwell Science Ltd., 1992, pp. 112-129.

Ta, Van-Dai et al. "Prediction and Portfolio Optimization in Quantitative Trading Using Machine Learning Techniques." Proceeding of the Ninth International Symposium on Information and Communication Technology, Dec. 2018, pp. 98-105.

Nousi et al., "Machine learning for forecasting mid-price movements using limit order book data," IEEE Access 7, 2019:64722-64735.

Ta et a;., "Prediction and portfolio optimization in quantitative trading using machine learning techniques," Proceedings of the Ninth International Symposium on Information and Communication Technology, 2018.

Roberts, Pasha., "Information visualization of the stock market ticks: toward a new trading interface," Diss Massachusetts Institute of Technology, 2003.

Sastry, Lakshmi., "User interface managment systems for engineering applications," Computer graphics forum vol. 11., No. 2., Edinburgh, UK, Blackwell Science Ltd., 1992.

Hochheiser et al., "Dynamic query tools for time series data sets: timebox widgets for interactive exploration," Information Visualization 3.1, 2004, 1-18.

* cited by examiner

FILTER COMPONENT FOR AUTOMATICALLY TRIGGERING ACTIONS BASED ON EVENTS IN TRADING INFORMATION

CROSS-REFERENCE TO RELATED APPLICATIONS

This application is a continuation of U.S. patent application Ser. No. 16/835,125, filed Mar. 30, 2020, which is a continuation of U.S. patent application Ser. No. 15/464,128 filed Mar. 20, 2017 (now U.S. Pat. No. 10,607,290), which is a divisional of U.S. patent application Ser. No. 13/463,753, filed May 3, 2012 (now U.S. Pat. No. 9,600,843); all of which are incorporated herein by reference in their entireties for all purposes.

BACKGROUND

In economics, a financial market is a mechanism that allows people (e.g., traders) and entities to buy and sell (i.e., trade) financial securities (e.g., stocks and bonds), commodities (e.g., precious metals or agricultural goods), contracts and other fungible items of value (herein after "securities" or "financial instruments") at prices that reflect supply and demand. Markets work by placing many interested buyers and sellers in one "place" (e.g., an actual or electronic marketplace), thus making it easier for market participants to find each other. A trader is a market participant who buys and sells financial instruments such as stocks, bonds, futures, commodities, options, currencies, swaps, and other financial instruments or derivatives thereof. Trading is the purchase and sale of financial instruments with the intention of profiting from a change in price. Unlike an investor who buys financial instruments with the goal of selling them after an appreciation in price (usually over the course of a year or more), a trader can make money when the instrument goes up or down in value, and does so over a considerably shorter period of time than an investor.

Real-time, raw market data supplied by market exchanges are commonly used by traders, rather than using delayed (such delays ranging from 10 to 60 minutes, per exchange rules) market data that is available for free. In addition to the real-time, raw market data, some traders purchase more advanced data feeds that include historical data and features such as scanning large numbers of stocks in the live market for unusual activity. Market data typically contains information useful in showing recent market transactions and marketplace activities. For example, a market instrument, such as an energy futures contract, may have an ask price and one or more bid prices to purchase that instrument. A bid price is the highest price that a buyer (i.e., bidder) is willing to pay for an instrument. It is usually referred to simply as the "bid." The ask price, also called offer price, offer, asking price, or simply ask, is the price a seller states she or he will accept for an instrument. In bid and ask, the bid price stands in contrast to the ask price or "offer," and the difference between the two is called the bid/ask spread.

Traders generally follow different timelines for transacting within a financial marketplace. Position/trend traders may stay in positions for over a few weeks, sometimes up to a year. Swing traders may hold positions for a few days to a few weeks. Day traders may hold positions throughout a trading day (for periods that are sometimes as short as fractions of a second or as long as a few hours) and finish the day with no open positions. This form of trading requires the trader to be present in front of the computer when trading is occurring and to quickly review potentially profitable transactions based on the market data.

A modern trader may use computer software (e.g., "trading software") to search for financial instruments that exhibit significant movement, either up or down, in a relatively short period of time. Depending on the trader's role in the market, the trader may not be interested in what will happen to a given instrument in ten years or even in one year. The trader may want to ride the change in price quickly, then sell the instrument and move on in search of other opportunities.

One problem with existing trading software is that market data is not efficiently displayed to a trader in a manner that deemphasizes non-priority data while emphasizing more critical data to enable the trader to quickly place orders based on the marketing data. Current trading software inefficiently occupies a computer screen's space by, for example, causing the display of all or a subset of market data without prioritizing the display of the "inside market," where the most recent market transactions occur, or other data of importance to a trader. Inefficient display of market data obscures the trader's view of more pertinent trading information, forcing the trader to take additional steps to follow the market and resulting in an increased period of time for the trader to initiate a market transaction (e.g., a bid and/or call). Meanwhile, the market may have changed during this increased time period, causing the trader's previous transaction to be based on inaccurate, old information that results in a potential loss of value to the trader.

Another problem with existing trading software is that a manual interaction is commonly required before a received update to the market data is displayed to the trader. This can happen, for example, when the active market is initially displayed on the trader's screen (e.g., as a displayed list of various price levels that reflect an active market for an instrument), but after one or more market transactions are made that increase or decrease the active market to a new active price level, the display of the active market can move off of the trader's screen. This requires that the trader perform additional steps to readjust or, depending on the display, "re-center" the display to show the active market. As mentioned above, time is of the essence for traders, and even a few extra seconds in making a transaction can adversely affect a trade.

Another problem with existing trading software is that a single point of input on the screen (e.g., via a mouse) limits the opportunity and ability of the software to perform complex operations, such as simultaneously managing multiple orders, which may require several separate user transactions to complete. Each individual user operation takes time to process, which interferes with the efficiency of performing a market transaction. For example, to buy a market instrument a user may have to perform the separate steps of pointing to a buy field, typing in a quantity, typing in a price, and pressing or clicking a confirmation indicator. More complex transactions, such as an order to join the highest bid, can require even more steps that result in loss of trading efficiency.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
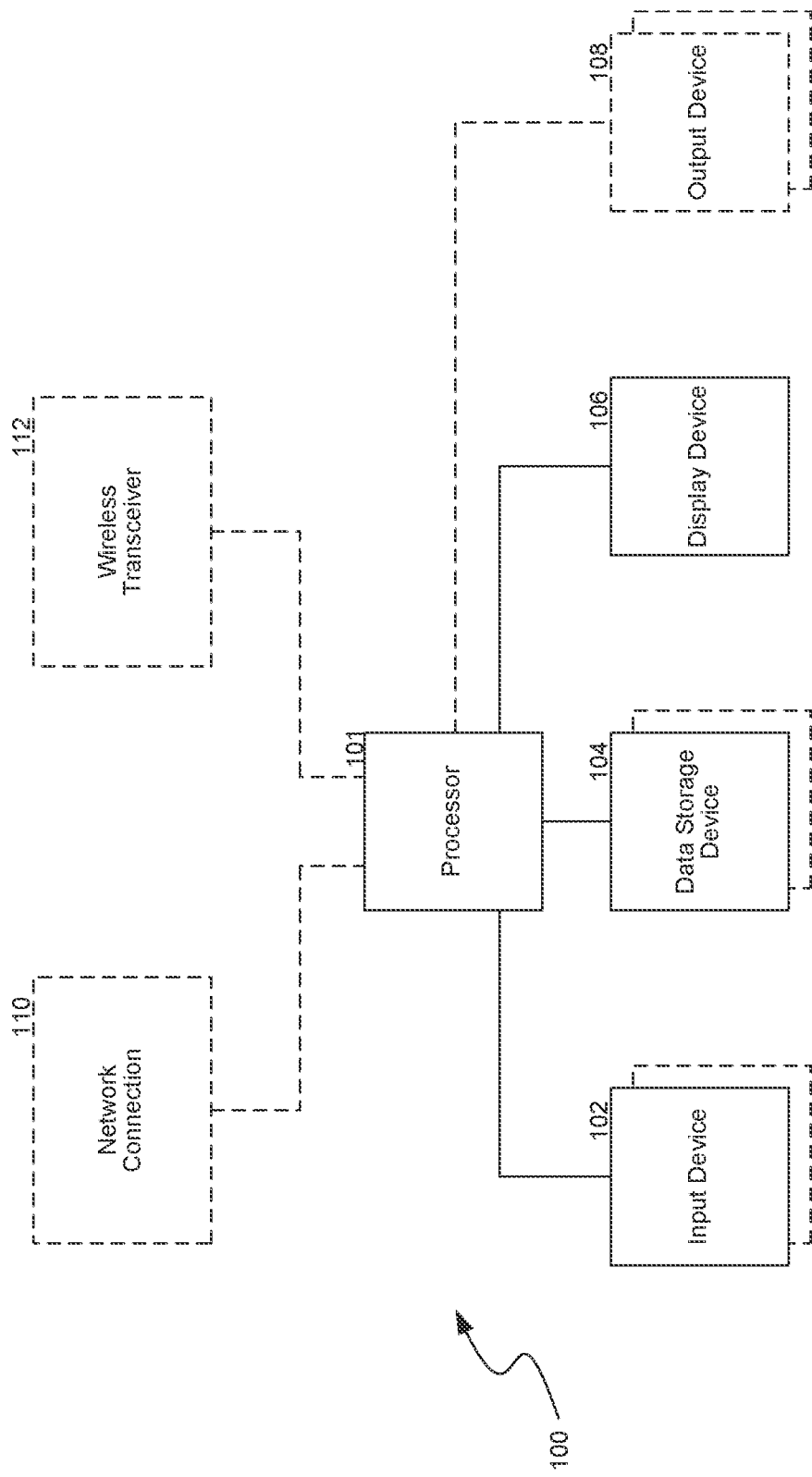
FIG. 1 is a block diagram of a basic and suitable computer that may employ aspects of the described technology.

Introduced below are methods and systems for generating market orders and for providing perspective to financial information by emphasizing some aspects of market data while minimizing less important aspects of market data. Market data is displayed such that it automatically moves to adjust to the inside market (i.e., the current state of the market based on active trading information reflecting at least one bid and at least one ask associated with a security). As new market data is considered, the displayed market data is updated to re-center the inside market about an area of a user's display. For example, market data can be displayed using a three-dimensional (3D) perspective, such as a wheel on a 3D display or viewer, or on a pseudo-3D perspective on a two-dimensional (2D) display. As used herein, the term 3D covers both of these displays. In this scenario, the wheel appears to rotate to re-center a portion of the wheel (e.g., the inside market) about a portion of the display (e.g., an axis). Rotation emphasizes market movement while leaving the inside market in an executable region or zone on the screen. Market orders can be entered by selecting portions of the displayed market data (e.g., a price level) and/or by using other methods of entry, such as a touch screen, mouse, keyboard, and/or gestures. Additionally or separately, market orders can be generated by a filter component that can produce, among other things, stop-limit orders. Portions of the methods and systems can be displayed and/or operate on different types of computers. For example, an array of tablet computers can be used to display various components of the described methods and systems. The components are movable between the different (or the same) types of computers in a master/slave and/or peer-to-peer communication architecture.

Various embodiments of the technology will now be described. The following description provides specific details for a thorough understanding and enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

In some embodiments, the described technology provides systems and methods for presenting dimensional perspective within market data. Although the described technology is applicable using a variety of different types of market data, special attention will be paid to real-time financial marketing data, such as the data associated with buying and selling financial securities and/or interacting with live financial markets.

In one embodiment and as further described herein, the described technology is a method of presenting real-time financial market data ("data") on a display in such a manner that important data (e.g., important to a securities trader) is emphasized while less significant data is not emphasized or is deemphasized. When new data is received, the described technology can automatically adjust to display the new data. If the new data contains information that is of higher importance than currently displayed data, the technology can adjust the display to give more prominence to the new data; however, if the new data is not of higher importance, the currently displayed data may maintain its current status on the display. For example, one type of data of importance to a financial securities trader is the inside market level, which is the current state of the market based on active trading information reflecting at least one bid (i.e., an offer to purchase a security at a particular price) and at least one ask (i.e., an offer to sell a security at a particular price) associated with a security. The described technology can automatically adjust the display of data to follow the inside market. For instance, as a financial security is sold there is less of that security available in the market, affecting the position of the inside market for that security. The described technology detects this change in position and automatically adjusts the display to show the current inside market for that security.

In some embodiments, the described technology automatically adjusts the display of data to center the inside market data about one or more various orientations associated with the display. Each orientation of displayed data can be associated with, for example, a horizontal orientation, a vertical orientation, or any degree of orientation in between. For example, the disclosed technology can display the market data in a vertical, up-down orientation. The data can be displayed in various configurations; however, in one example each price associated with a security is stacked on top of other prices associated with the security. As further detailed below and as shown in the figures, this can create a display of chronologically stacked prices about a visible or invisible vertical orientation or axis.

The described technology can automatically adjust the displayed prices to show important data such as the inside market data, which includes at least one financial transaction (e.g., an ask or bid for the security) at a particular price. For example, a transaction can display alongside its corresponding price to create a price-level-quantity pair. One or more price-level-quantity pairs are stacked chronologically about the axis. Upon detecting a change in the market data that affects the inside market level, the described technology can adjust the display of the stacked price-level-quantity pairs to reflect the new inside market level by, for example, moving the stacked price-level-quantity pairs up or down the vertical axis. In this way, the described technology automatically adjusts to re-center the display of the inside market level about a horizontal orientation or axis in response to changes detected in real-time or staged marketing data (e.g., non-real-time data stored in a database and/or text file) by moving the stacked price-level-transactions pair up or down the vertical axis. The automatic re-centering allows the trader to view the display and follow the inside market with minimal interaction required to follow market changes that may affect the trader's position. The axes that can be used for displaying the data, including the stacked price-level-transactions pair, can be reversed or positioned in other orientations. For example, the stacked pairs can re-center about a vertical axis by moving the stacked pairs to the right or left of the horizontal axis.

In some embodiments, the described technology further emphasizes important data by creating perspective for the displayed market data. For example, a 3D perspective can distinguish important market data, such as the inside market level data, from less important data. The important data can be given more prominence on the display to aid the trader with a quick view of the inside market level, while providing less emphasis to data that does not affect the inside market level. For example, to provide a 3D perspective a first font size can be used to display the more important market data (e.g., inside market data), and a second font size can be used to display the less important market data.

In another embodiment, the described technology provides a 3D perspective to give prominence to all or a subset of the inside market level. Three-dimensional perspective applied to the stacked price-level-quantity pairs, for example, gives the effect that the pairs are mapped to a 3D object. However, applying a 3D perspective is not limited to the stacked price-level-quantity pairs. Other aspects of market data can be mapped to a 3D perspective, such as a price, order, and/or quantity, for example. A 3D object may consist of one or more linear and/or non-linear configurations. For example, a non-linear 3D object can include an arc, curve, parabola, sphere, wheel, or other geometrical shape. The 3D perspective used to map the data can be selected by the trader at any point during active or inactive trading. For example, while the markets are actively trading a security, the user can adjust the display of real-time market data by choosing a wheel perspective, then changing to an arc perspective, then adjusting the arc's dimensions, and finally choosing to use a circular billboard perspective to display the market data, as explained more fully below.

The 3D perspective can be used with automatic re-centering to display stacked price data, including stacked price-level-quantity pairs, that appear to move and/or rotate about an axis to center important trading information. For example, and as further depicted in the figures, the stacked price data can be mapped about a 3D wheel that rotates about an axis in real time to automatically re-center the inside market level information (e.g., a portion of the displayed stacked price-level-quantity pairs).

The wheel, or other object, rotates constantly and automatically in response to changes in the market data. The rate of the object's (e.g., the wheel's) movement can be adjusted either automatically, based on the rate of changes to the data, for example, or manually. Manual rate adjustment can be based on user interaction. For example, a trader may move an indicator (e.g., a mouse, stylus or a finger) over or at a place associated with the object to slow or speed up the objects movement. In one instance, the trader may want to slow the wheel's rotation to review the data displayed about the wheel. The trader can use a mouse, finger, keyboard, or other indicator to slow or pause the rotation of the wheel. Removing the indicator can cause the wheel to automatically readjust to the current inside market level.

A trader can manipulate the mapped, stacked price data using various techniques. For example, a scroll wheel or page-up/page-down buttons of a keyboard or pinch-and-zoom gestures on a touch screen-enabled device can control the position of displayed price data by zooming and shifting the data about the display.

In some embodiments, the described technology receives an order entry for a trade. A trade can be an offer to sell a security (an "ask"), an offer to buy a security (a "bid"), or an order to cancel a previous offer. The trade can be associated with the displayed price data, including the stacked price-level-quantity pairs. Offers can be added via a keyboard entry (soft or hard keyboard), mouse, touch screen, or gesture, by dragging and dropping a representation of an order on or near a displaced price level, or via one or more other actions. For example, a portion of the display can include fields for receiving order input, such as the quantity of securities to purchase or sell and the price. In one example, a bid or ask for a security at a certain price can be submitted to the marketplace (e.g., NASDAQ, etc.) by selecting the desired price data. Selecting the price can automatically cause an order to be submitted at that price. Subsequent selections cause additional orders to be submitted. Default orders can be set for purchasing a default quantity of securities. Having a default order of 50, for example, will cause an order for a quantity of 50 to be placed when the user selects the desired price-level, thus decreasing the amount of time required to make multiple trades or define multiple order parameters.

In another embodiment, selection of the price (e.g., by any one or more of the selection methods mentioned herein) must be followed by user confirmation before the order is submitted. For example, after the user selects to buy a security at a price-level, by using a mouse, stylus, finger, button, or other indicator, the user is presented with dialogue information requesting the user to perform an additional step, such as making another selection or performing a step. Once an order has been submitted, the mapped object (e.g., the wheel) rotates automatically to show changes, if any, in the market data.

In some embodiments, the described technology is implemented using a touch screen-based device, such as a mobile computer, smart phone, or tablet computer. Order entry and other commands can be input into the described technology via the touch screen using soft keys, a stylus, one or more fingers, or other indicator. A touch screen allows entering commands without the necessity of dedicated buttons or icons on the screen. Using a touch screen for order entry allows a user to select a price displayed on the screen as input for generating an order having that price. Additionally or alternatively, a partially configured order (e.g., an order having a quantity but not a price) can have a graphical representation (e.g., an icon) that can be selected and moved over a price displayed on the screen. User input (e.g., release of a mouse button) can cause a corresponding release of the graphical representation, and an order generated at that price.

Gestures can be used as input via a touch sensitive screen, virtual reality (e.g., a virtual reality glove), or other input device. A gesture is user input that consists of one or more movements, such as a swipe of a finger. The trader can perform various gestures on the screen of the display to execute different commands. For example, a brief finger swipe down can generate a sell order at the highest resting bid. A brief finger swipe up can generate a buy order at the lowest resting order. Touching and holding an order block associated with a price-level-quantity pair can hold the order until the touch is released. Additionally or alternatively, a gesture used to hold a first price or price-level-quantity pair can be moved, by sliding the finger, to hold a second price or pair. Releasing the finger can automatically send held orders to a marketplace.

Combinations of movements can generate additional commands. For example, an "L"-shaped gesture can generate an order to join the best offer, while a "T"-shaped gesture can generate an order to join the highest bid. The command generated from the gesture can be either independent or dependent of the placement of the gesture on the screen. For example, the described technology can be configured to be independent to the location of the gesture such that, regardless of where an individual gesture is made on the screen, it always performs the same command. For example, a circular swipe can be used anywhere on the screen to cancel all pending orders. Other examples of gestures that could be performed across the screen are a two-finger pinching vertical motion used to collapse the market depth of the displayed price data and a two-finger spreading vertical motion used to expand the market depth of the displayed price data.

Alternatively or additionally, the described technology can be configured such that a gesture performed in one part of the screen constitutes one command and that same gesture performed in another part of the screen constitutes a different command. For example, a downward swipe within a sell column (described below) of the price-level-quantity pairs will sell a default/specified quantity of securities at the best bid price. An upward swipe within the buy column (described below) of the price-level-quantity pairs will buy a default/specified quantity of securities at the best offer price.

Multiple gestures, using more than one finger and/or touch, can be simultaneously performed or performed in sequence to generate other commands.

In one example, the described technology implements a queue of multiple pending commands for an order. The queue acts like a holding pen to batch commands for placing orders. A subset of the queue or the entire queue can be represented as an icon or indicator on the screen. The user can select the queue for execution, causing the performance of each of the commands or a subset of the commands within the queue. Selecting the queue, or the subset of the queue, can be performed by a gesture that moves the queue/subset to one or more prices, or by otherwise indicating a desire for the queue/subset to execute (e.g., selecting a prompt, inputting a voice command, etc.). Optionally, and as described above, a separate confirmation may be required before the commands associated with the queue/subset are executed.

The queue of commands can be created and/or manipulated using various programmatic methods such as manually inputting commands and/or moving predefined objects into the queue. For example, and as further described below, the user can drag and drop various predefined objects into a queue. Each object has an associated command, such as an offer to "buy X lots two price levels above the best bid," "decrease bid if Y occurs," and various conditional statements (e.g., "if," "then," etc.). Using a touch screen, or a mouse, the user can manipulate the position of the objects within the queue to reorder when and/or how a particular component will execute. Simple to complex strategies can be created in a queue, and multiple different queues can be created for various scenarios. Each queue can be associated with a customizable gesture, such that when a gesture is performed the corresponding queue executes. For example, a "<"-shaped gesture can be associated with a "Buy-Strategy #1 queue," such that when the gesture is performed the command sequences within the "Buy-Strategy #1 queue" are performed. Queues can be made on the fly, saved for later use, augmented, and/or shared between different securities and different users.

In some embodiments the described technology includes a filter component. In one example the filter component filters bids and asks for a display according to specified criteria, such as a quantity of orders, timing, a particular lot size, or a user-defined rule. For example, the user can set the filter to only display orders equal to or greater than a 78-lot sell order. The user can create more complex scenarios by combining criteria. For example, a filter can be set up to only display market data having a bid or offer for a total quantity of >500 securities, where at least five orders make up the >500 securities and one of those orders is a 78-lot order. The last two characteristics (i.e., at least five orders make up the >500 securities and one order is a 78-lot order) are not available for all exchanges, so the described technology relies on the exchange market data where available or, if exchange data at that level is unavailable, user-generated inferences or estimates of order book composition to make its decisions.

In some embodiments the filter component includes technology to generate orders based on various criteria, such as a quantity of orders, timing, a particular lot size, or a user-defined rule. The filter component can be configured to control when and how orders are and the type of orders submitted. For example, a filter can be configured such that an order entry is triggered, or an alert is generated, upon the occurrence of an event, such as a certain price appearing in the inside market level data. In another example, the filter component can be configured to monitor the market data for a preconfigured order scenario, and upon detection of the order scenario the order is automatically made. Alternatively, upon detection of the order scenario, feedback is provided to the user requesting confirmation to enter the order. Confirmation can be provided by any input, such as a mouse click, button actuation, or gesture. In this scenario, the filter component allows the described technology to display desirable price-level-quantity pairs based upon a strategy or user-defined filter rule, and with one click or other action, the user can execute one or more transactions according to the filter rule. As described above, the filter component is configurable to automatically execute the one or more transactions when the filter-rule parameters are met.

In one embodiment the filter component can be configured to detect various patterns in the market data and activity, such as "iceberg orders." An "iceberg order" is an order that increases in quantity over a period of time or upon the occurrence of specific events, such as the initial "iceberg order" quantity being filled. For example, an "iceberg order" may order a small lot number "X" of a security at one point in time and subsequently add X+50 lots as the initial order(s) is filled. The filter component can monitor the market data over time to detect "iceberg orders." The described technology can notify the user that such an order is being made, even before all orders constituting the "iceberg order" have been completed.

The filter component can be located on the same screen as the price data, on a split screen alongside the price data, or on a separate display. Once a filter rule is created, the filter component can be minimized or removed from the screen yet still be operational. Upon detection of market data having the parameters configured in a filter rule, a minimized or hidden filter component can automatically be shown in a viewable area of the screen and/or send a visible or audible alert to the user signaling that the filter-rule criteria have been met.

In some embodiments, various aspects of the described technology can be separated and operated on multiple devices to create a "linked" suite of devices. Each device may include its own display and user input facilities to control all or a subset of the described technology. A master device can control which of the other devices can interact with the technology and in what manner. For example, tablet computers such as the iPad® and/or Android®-based tablets can be communicatively coupled (e.g., wired or wirelessly configured) to communicate with each other. Various communication technologies exist that will enable such communication, such as Bluetooth®, WiFi, and TCP/IP. Each tablet computer may view all or a subset of the described technology. A master tablet can control which slave tablet operates specific portions of the technology. For example and as described below, the master iPad® may be used to move, for example using a sliding gesture, the display of buy-related stacked price data to slave tablet #1, sell-related stacked price data to slave tablet #2, filter-component information to slave tablet #3, and/or filtered price-level-quantity pairs to slave tablet #4. Each slave tablet can operate independently of the master tablet, such that it can be used to control the aspects of the technology displayed on its screen. Multiple devices allow a single user to logically separate functionality onto separate displays. Alternatively, the separate devices can be operated by other users such that specific functions are delegated to different users. The master device (e.g., the master tablet computer) can reconfigure, in real time, the placement of portions of the technology onto various slave devices or bring some or all of the portions back to the master device.

FIG. 1 and the following discussion provide a brief, general description of a suitable computing environment in which aspects of the described technology can be implemented. Although not required, aspects of the technology may be described herein in the general context of computer-executable instructions, such as routines executed by a general or special purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (packet switched, circuit switched, or other scheme).

The described technology can also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or sub-routines may be located in both local and remote memory storage devices. Those skilled in the relevant art will recognize that portions of the described technology may reside on a server computer, while corresponding portions reside on a client computer (e.g., PC, mobile computer, tablet, or smart phone). Data structures and transmission of data particular to aspects of the technology are also encompassed within the scope of the described technology.

Referring to FIG. 1, the described technology employs a computer 100, such as a personal computer or workstation, having one or more processors 101 coupled to one or more user input devices 102 and data storage devices 104. The computer 100 is also coupled to at least one output device such as a display device 106 and one or more optional additional output devices 108 (e.g., printer, plotter, speakers, tactile or olfactory output devices, etc.). The computer 100 may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1).

Figure 2:
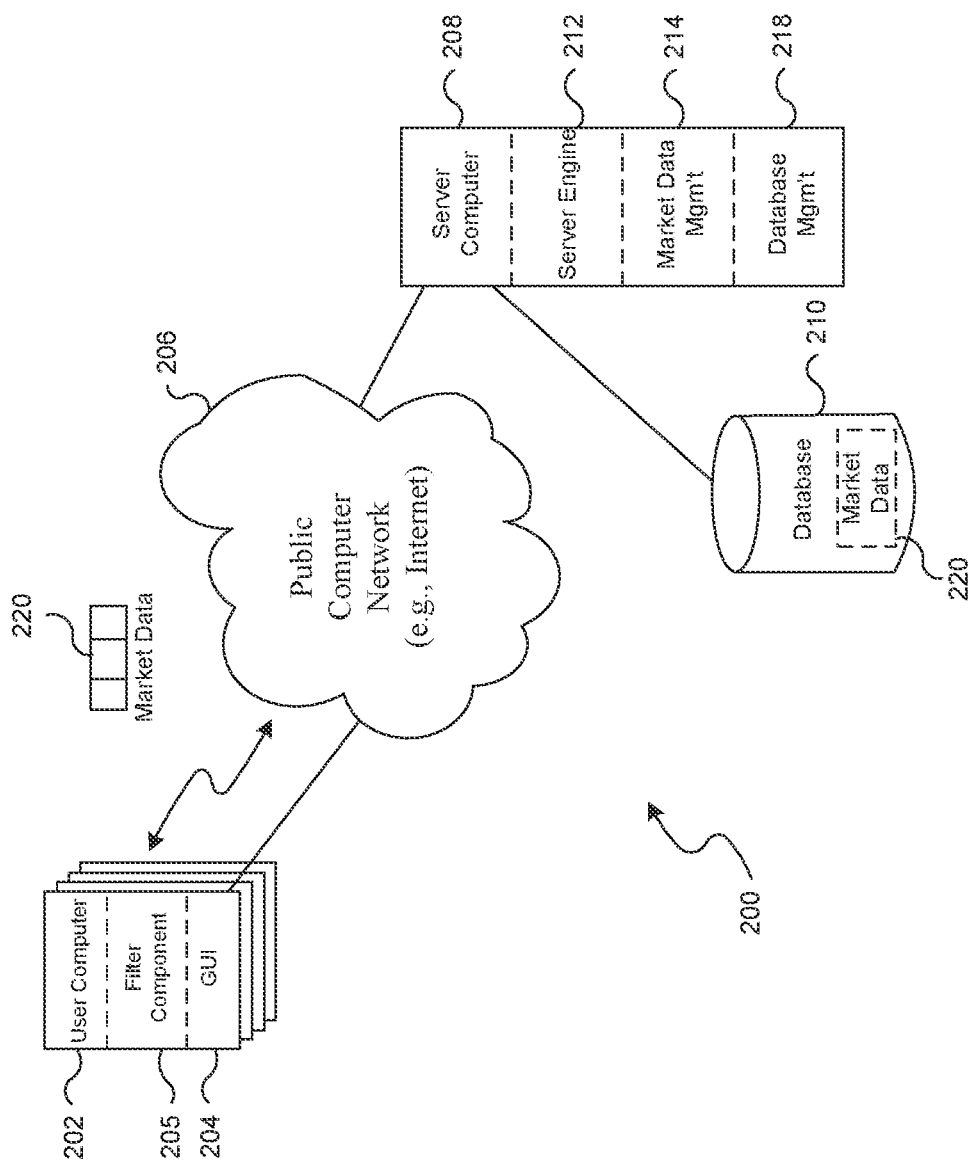
FIG. 2 is a block diagram illustrating a simple, yet suitable system in which aspects of the described technology may operate in a networked computer environment.

Aspects of the described technology may be practiced in a variety of other computing environments. For example, referring to FIG. 2, a distributed computing environment with a network interface includes one or more user computers 202 (e.g., mobile devices) in a system 200, each of which includes a graphical user interface (GUI) program component (e.g., a thin client component) 204 that permits the computer to access and exchange data, such as market data 220, with a network 206 such as a LAN or the Internet, including web sites, ftp sites, live feeds, and data repositories within a portion of the network 206. The user computers 202 may be substantially similar to the computer described above with respect to FIG. 1. The user computers 202 may be personal computers (PCs) or mobile devices, such as laptops, mobile phones, or tablets. The user computers 202 may connect to the network 206 wirelessly or through the use of a wired connection. Wireless connectivity may include any forms of wireless technology, such as a radio access technology used in wireless LANs or mobile standards such as 2G/3G/4G/LTE. The user computers 202 may include other program components, such as a filter component 205, an operating system, one or more application programs (e.g., word processing applications, spreadsheet applications, or Internet-enabled applications), and the like. The user computers 202 may be general-purpose devices that can be programmed to run various types of applications, or they may be single-purpose devices optimized or limited to a particular function or class of functions. More importantly, any application program for providing a graphical user interface to users may be employed, as described in detail below. For example, a mobile application or "app" has been contemplated, such as one used in Apple's® iPhone® or iPad® products, Microsoft® products, Nokia®, or one used in Android®-based products.

At least one server computer 208, coupled to the network 206, performs some or all of the functions for receiving, routing, and storing of electronic messages, such as market data 220, web pages, audio signals, and electronic images. While the Internet is shown, a private network, such as an intranet, may indeed be preferred in some applications. The network may have a client-server architecture, in which a computer is dedicated to serving other client computers, or it may have other architectures, such as a peer-to-peer, in which one or more computers serve simultaneously as servers and clients. A database or databases 210, coupled to the server computer(s), stores some content (e.g., market data) exchanged between the user computers; however, content may be stored in a flat or semi-structured file that is local to or remote of the server computer 208. The server computer(s), including the database(s), may employ security measures to inhibit malicious attacks on the system and to preserve the integrity of the messages and data stored therein (e.g., firewall systems, secure socket layers (SSL), password protection schemes, encryption, and the like).

The server computer 208 may include a server engine 212, a market data management component 214, and a database management component 218. The server engine performs basic processing and operating system level tasks. The market data management component 214 handles creation, streaming, or routing of market data. Users may access the server computer by means of a network path associated therewith. The database management component 218 includes storage and retrieval tasks with respect to the database, queries to the database, and storage of data. In some embodiments, multiple server computers 208 each having one or more of the components 212-218 may be utilized. In general, the user computer 202 receives data input by the user and transmits such input data to the server compute 208. The server computer 208 then queries the database, retrieves requested pages, performs computations and/or provides output data back to the user computer 208, typically for visual display to the user.

A. Graphical User Interfaces (GUIs)

Figure 3:
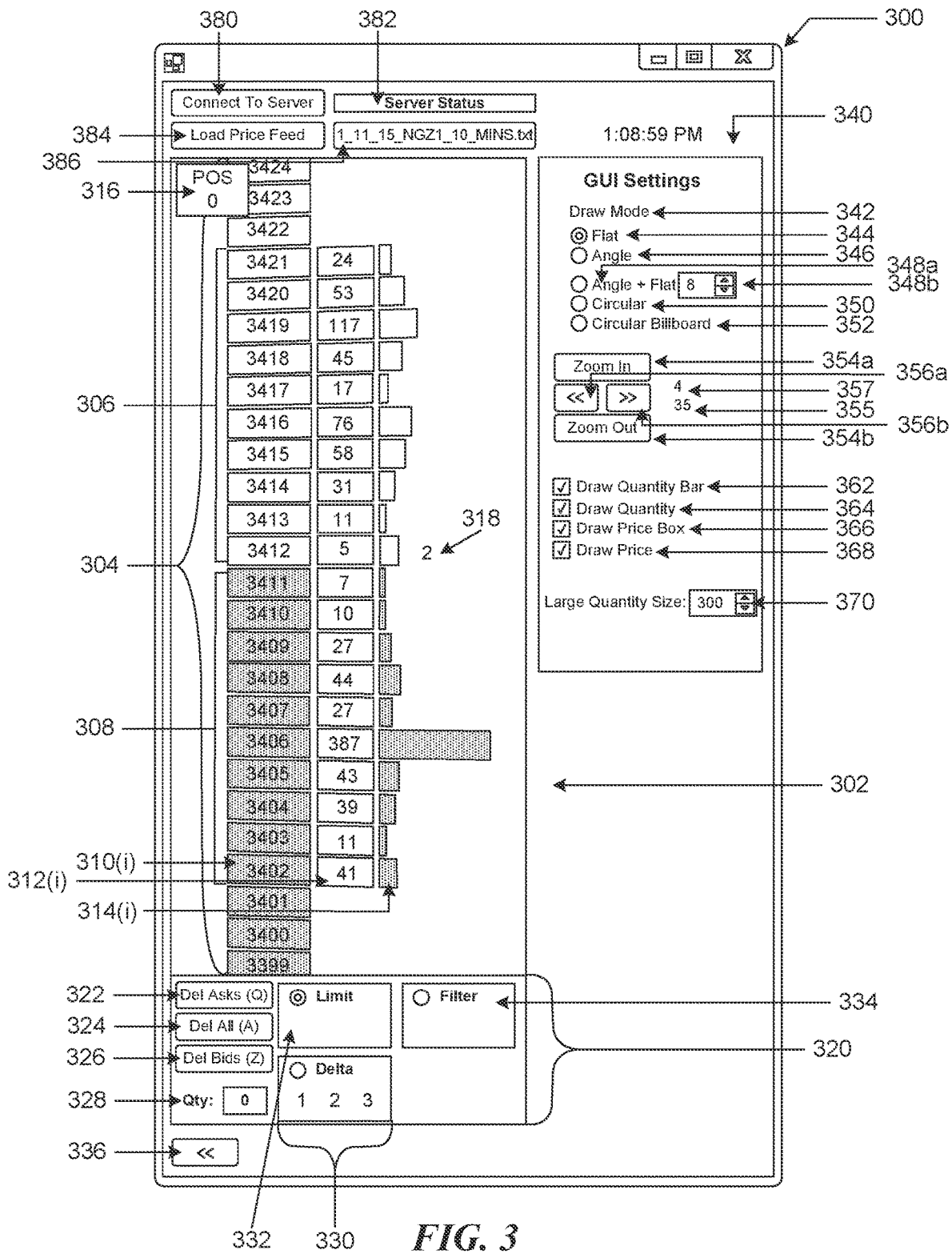
FIG. 3 is a graphical user interface capable of implementing features of the described technology.

FIG. 3 is a graphical user interface (GUI) 300 capable of implementing features of the described technology. The GUI 300 contains several component blocks such as blocks 302, 320, and 340. Block 302 displays market data 304. The market data 304 may be "live" data received from one or more financial exchanges or local data accessible by the GUI 300. The GUI 300 can automatically connect to a server (e.g., server computer 208) to receive the market data 304, or a user can depress a button 380 to manually connect to the server. A server status 382 indicates whether the GUI is connected or disconnected to the live feed provided by the server, such as the server computer 208. Optionally, the market data 304 can be loaded, from a file or other record, into the GUI 300 via a button 384. A filename having market data 304 can be referenced by a uniform resource identifier (URI) (e.g., a full URI, or just the scheme-specific portion of one, or even some trailing component thereof), as is known in the art. The URI appears in an indicator window 386. FIG. 3 depicts a text file (i.e., .txt); however, any record capable of storing information can be substituted (e.g., .xml, .doc, .xls, etc.)

The market data 304 contains price-levels 310($i$) to indicate various prices at which securities (e.g., grain, wheat, gold, oil contracts, etc.) are being offered for sale and purchase. For example, price-levels 310($i$) include price numbers of 3399-3424. The market data can also contain quantity numbers 312($i$) that are associated with an individual price. For example, price number 3402 is associated with a quantity of 41 securities, i.e. 41 securities contracts are bid to buy at the price number of 3402. Other quantity numbers (11, 39, 43, 387, 27, 44, 27, 10, 7, 5, 11, 31, 58, 76, 17, 45, 117, 53, and 24) are depicted alongside a respective price 310($i$). Together, a price 310($i$) and its associated quantity number 312($i$) make up a "price-level-quantity pair." The market data 304 has 20 price-level-quantity pairs that are displayed as 3402-41, 3403-11, 3404-39, 3405-43 . . . 3421-24.

Price-level-quantity pairs are either price-level-sell pairs 306 or price-level-buy pairs 308. Price-level-sell pairs 306 are price transactions where the transactions include offers to sell a certain quantity of the security (i.e., the quantity number 312($i$)) at the price (i.e., 310($i$)). Price-level-buy pairs 308 are price-level-quantity pairs where the quantities include bids to buy a certain quantity of the security (i.e., the transaction number 312($i$)) at the price (i.e., 310($i$)). For each price-level-quantity pair (310($i$)+312($i$)) a graphical indicator 314($i$) depicts the volume of transactions that have occurred at that price as reflected by the transaction number 312($i$). A position indicator 316 is a graphical display of the number of active positions (e.g., filled offers to buy and/or filled offers to sell) that a user currently has at risk, as further detailed below. A last-trade indicator 318 indicates for a last transacted buy/sell transaction in that instrument the quantity of securities traded at a corresponding price 310($i$). The last-trade indicator 318 automatically adjusts to display, at a position associated with the price 310($i$) of the last trade, the quantity of trades made at that price 310($i$). For example, a last-trade indicator 318 of "2" associated with a price 310($i$) of "3412" means that two securities were recently sold at 3412.

GUI settings block 340 is used to configure the display of the market data 304. A draw mode 342 includes configurations that can be adjusted to change the perspective of market data. As described above, the market data 304 can be mapped to a virtual 3D object. The properties of the 3D object, such as angle, curvature, and flatness (if any), can be configured via the GUI settings block 340, in particular draw mode selectors 342-370. A flat indicator 344 maps the market data to a flat surface, i.e., without a 3D perspective. In FIG. 3, the flat indicator 344 is selected, resulting in the market data 304 (e.g., all price levels 310($i$) and price-level-quantity pairs (310($i$)+312($i$)) being mapped to a flat (i.e., two-dimensional) surface. Optionally, the graphical indicators 314(*i*) are mapped in accordance with the market data 304. An angle indicator 346 maps the market data 304 to an angled perspective as further detailed in FIG. 4. An angle-flat indicator 348*a* flattens a selectable quantity 348*b* of the market data 304 and provides an angled perspective to the remaining visible market data 304, as further detailed in FIG. 5. A circular indicator 350 maps market data 304 to a circular perspective as further detailed in FIG. 6. A circular-billboard indicator 352 maps market data 304 to a circular perspective and maintains a flat perspective for each price 310(*i*) and price-level-quantity pair 310(*i*)+312(*i*), as further detailed in FIG. 7.

A zoom-in button 354*a* increases the magnification of the display of the market data 304 in block 302. A zoom-out button 354*b* decreases the magnification of the display of market data in block 302. Successive depresses of buttons 354*a*/354*b* affect the amount of magnification applied to the market data 304. A zoom-number 355 indicates a zoom unit value that increases in conjunction with use of the zoom-out button 354*b* and decreases in value based on use of the zoom-in button 354*a*. Angle indicators 356*a* and 356*b* affect the viewing angle or perspective applied to market data 304. A perspective number 357 indicates a perspective unit value that increases in conjunction with use of the angle indicator 356*b* and decreases in value based on use of the angle indicator 356*a*. Zooming and perspective features are further discussed below and in FIGS. 8-10.

A draw quantity bar indicator 362, when selected, displays the graphical indicators 314(*i*) in block 302. A draw quantity indicator 364, when selected, displays the numbers associated with each transaction number 312(*i*). A draw price box indicator 366, when selected, displays the border associated with each price 312(*i*); and a draw price indicator 368, when selected, displays the numbers associated with each price 310(*i*). A large quantity size indicator 370 is used to configure a maximum viewable size of the graphical indicators 314(*i*) relative to the corresponding transaction number 312(*i*). For example, if the large quantity size indicator 370 is set to 300, each of the graphical indicators 314(*i*) will be limited to a graphical expression of 300, even if the transaction number 312(*i*) is greater than 300. An expansion indicator 336, when selected, is used to expand and contract the display of UI settings block 340.

Order block 320 includes technology to add, remove, and modify offers. A delete asks button 322, when activated, removes all open positions for offers to sell a security. A delete bids button 326, when activated, removes all open positions for offers to buy a security. A delete all button 324, when activated, removes all open positions for all offers related to a security. Optionally, "hot keys" are associated with each respective button 322-326. For example, pressing the "Q" button can delete all asks, pressing the "Z" button can delete all bids, and pressing the "A" button can delete all offers. When an offer to sell (i.e., an ask) or an offer to buy (i.e., a bid) is removed, the new position is reflected at the position indicator 316. As mentioned above and as further described below, gestures can be applied to deleting offers.

A limit indicator 332, when selected, limits an order to a specific price or any better price. A buy limit order can only be executed at the limit price or lower, and a sell limit order can only be executed at the limit price or higher. A limit order is filled if the security's market price reaches the limit price. A quantity indicator 328 receives a default value to use when making orders. For example, if the quantity indicator 328 contains a value of 50, then an order for quantities of 50 securities can be entered at a time. As detailed above, orders can be entered in various ways. For example, an indicator (e.g., cursor, finger, stylus, etc.) can select the price or price-level-quantity pair having the price at which the user desires to purchase a security. Pressing the indicator to the screen (e.g., when using a touch screen) or clicking a mouse when its cursor is in range of the desired price (e.g., when using a mouse, trackball, etc.) generates an offer to purchase the security at the selected price. If the quantity indicator has a value other than zero (e.g., 50), multiple (e.g., 50) securities will be submitted for purchasing at the selected price.

A delta indicator 330, when selected, places orders within a predefined number of price increments (or "ticks") of the best sell offer or the best buy bid (i.e., the highest offer price-value 310(*i*) of a price-value-transaction pair). The use of the Delta indicator 330 allows the user to make offers without the necessity of entering or selecting separate price-levels 310(*i*) for each offer. The "1 2 3" indicators of the delta indicator 330 are each separately selectable positions. Each position "1 2 3," when selected, generates an offer having a price whose value is a configurable number of "ticks" (i.e., price increments) away from a current best offer. For example, if indicator "1" is configured to be one tick (e.g., $10) away from a current best offer (e.g., $1000), selecting the "1" indicator generates an order having a price one tick higher than the current best offer (e.g., $1010). The order also has a quantity indicated by the quantity indicator 328. This helps to minimize the number of steps a trader must complete before making an order. As mentioned above and as further described below, keyboard entry, mouse selection, touch-enabled screen and/or gestures are used to add and/or manipulate offers. A filter indicator 334, when selected, enables and optionally displays aspects of the filter component 205, as described above and as further described below and depicted in FIGS. 15*a-b*.

A partially configured order (e.g., an order having a quantity but not a price) can have a graphical representation (not shown) that when dropped onto or near a price 310(*i*) generates an order having that price 310(*i*). For example, if an icon representing an order having a quantity 328 of "10" is dragged and placed (not shown) onto a price of "3402," an order for 10 units at a price of 3402 is automatically generated. As mentioned above, an additional step may be required to confirm the order before it is submitted to the exchange.

Figure 4:
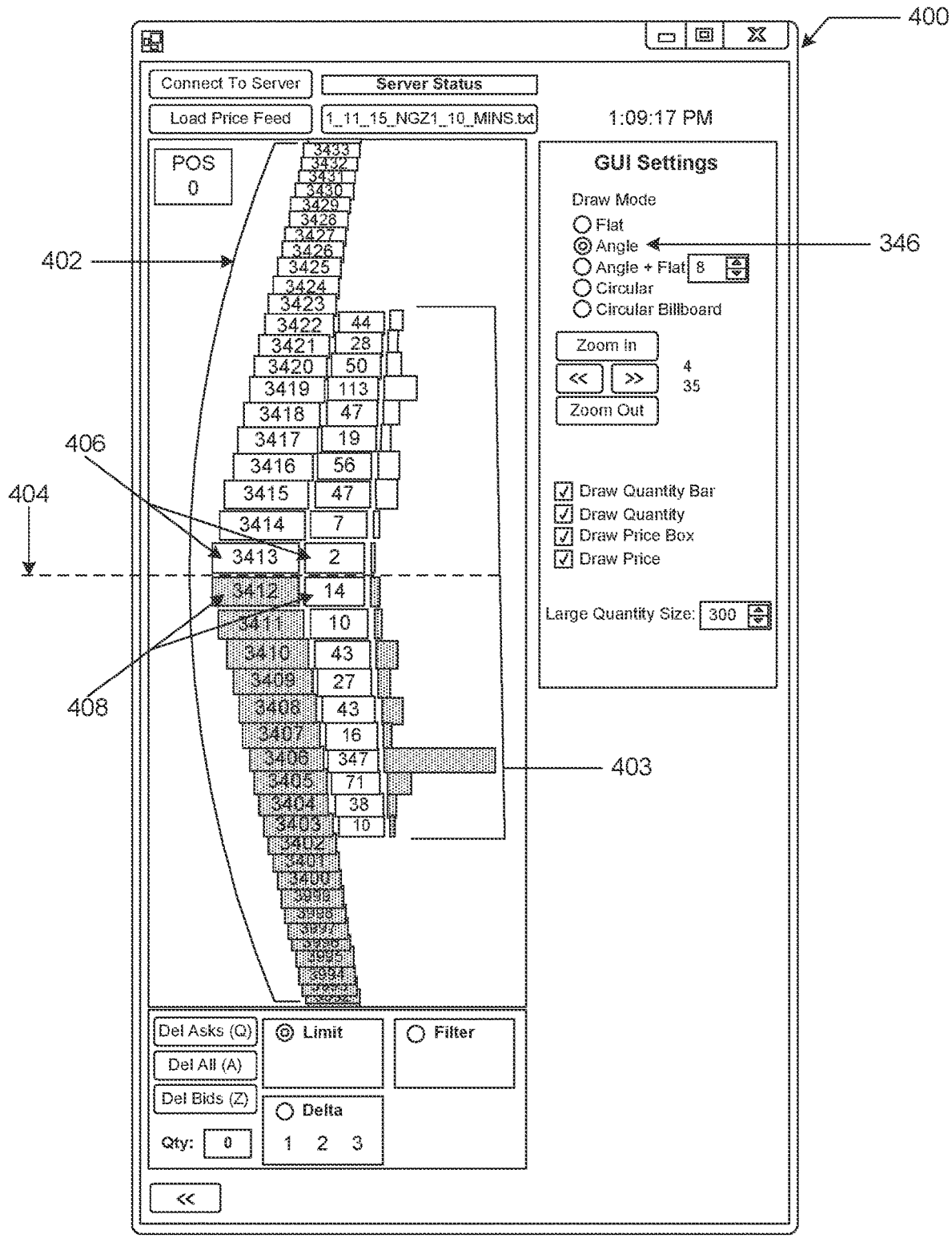
FIG. 4 is a graphical user interface that displays market data using an angled pseudo-three-dimensional (3D) perspective.

FIG. 4 is a graphical user interface (GUI) 400 capable of implementing features of the described technology. GUI 400 is similar to GUI 300; however, in GUI 400 the angle indicator 346 is selected. When the angle indicator 346 is selected an angle 402 is applied to the market data 304, for example by applying the market data 304 to a mathematically derived triangle, parabola, or other shape. The center of an inside market 403 (i.e., between the lowest sell-offer price-level-quantity pair 406 and highest buy-offer price-level-quantity pair 408) automatically adjusts to a position located approximately at an apex or axis of symmetry 404 of the parabola. For example, to reflect changes (e.g., offers made, removed, and/or filled) detected in new market data, the described technology will automatically update and re-center the market data 304 by positioning the inside market 403 proximate to the axis of symmetry 404.

Figure 5A:
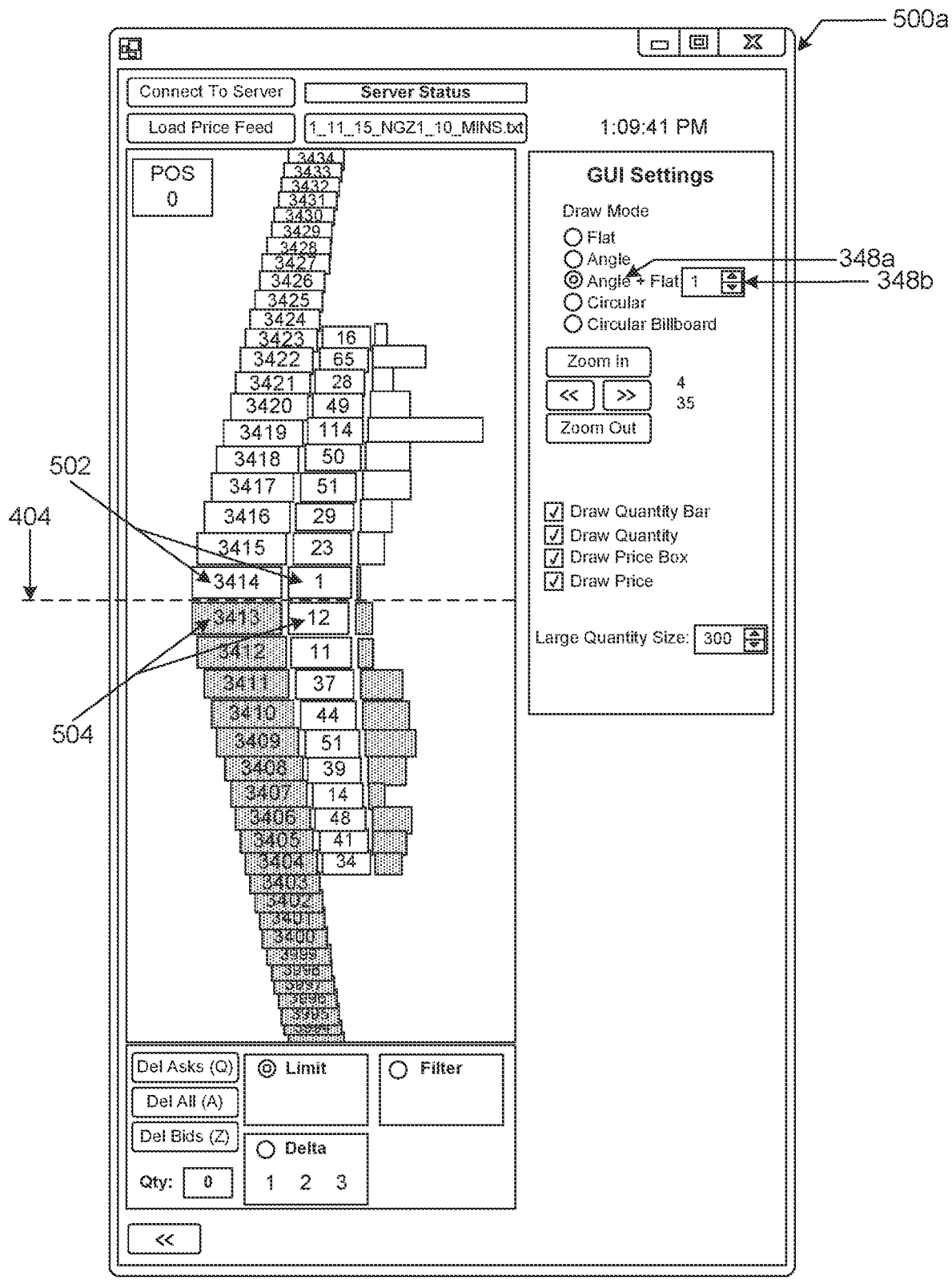
FIGS. 5*a-b* are graphical user interfaces that display market data using an angled-flat pseudo-3D perspective.
Figure 5B:
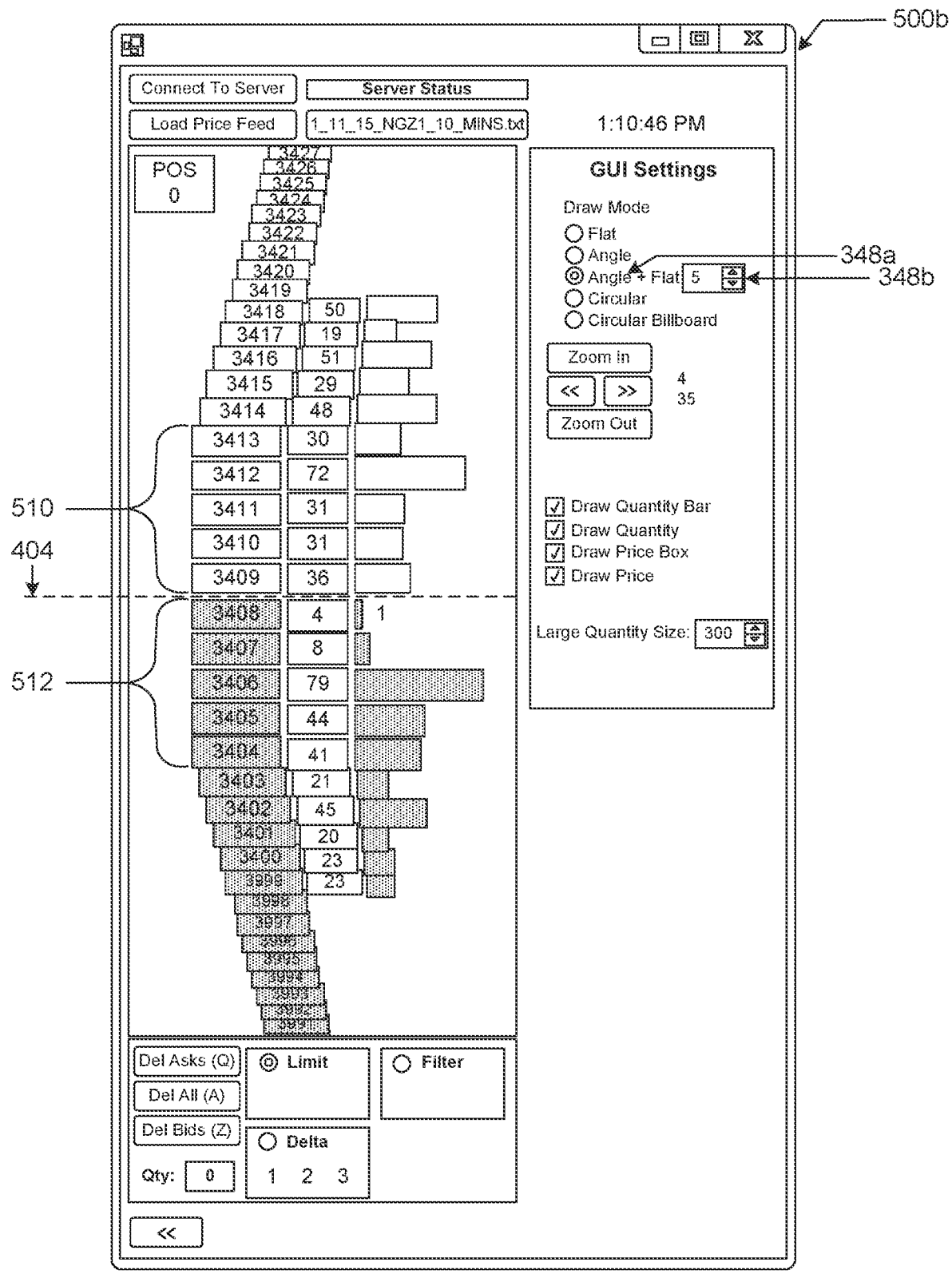

FIGS. 5*a*-5*b* are GUIs capable of implementing features of the described technology. GUI 500*a* is similar to GUI 300; however, in GUI 500*a* the angle-flat indicator 348*a* is selected. When the angle-flat indicator 348*a* is selected, an angle or curve is applied to the market data 304, for example by applying the market data 304 to a mathematical parabola, similar to that described above for FIG. 4. However, when a selectable quantity 348b of the angle-flat indicator 348a displays a non-zero value, price values 310(i) and/or price-value-transaction pairs (310(i)+312(i)) are flattened if they are within a level above or below the axis of symmetry 404 by the selectable quantity 348b (e.g. the non-zero value). For example, if the selectable quantity is equal to 1, the first price 310(i) or price-level-quantity pair 502 above the axis of symmetry 404 is flattened and aligned with a flattened price 310(i) or price-level-quantity pair 504 below the axis of symmetry 404. This feature is also shown in FIG. 5b, depicting GUI 500b, where the selectable quantity 348b is 5. As depicted in FIG. 5b, five sell-offer price-level-quantity pairs 510 are flattened and aligned with five buy-offer price-level-quantity pairs 512. As described above, as new market data is received, the price and/or price-level-quantity pairs are updated, and the display of the representation of the inside market is automatically re-centered relative to the axis of symmetry 404, while maintaining the angled, flattened price-level-quantity pairs 510 and 512.

Figure 6:
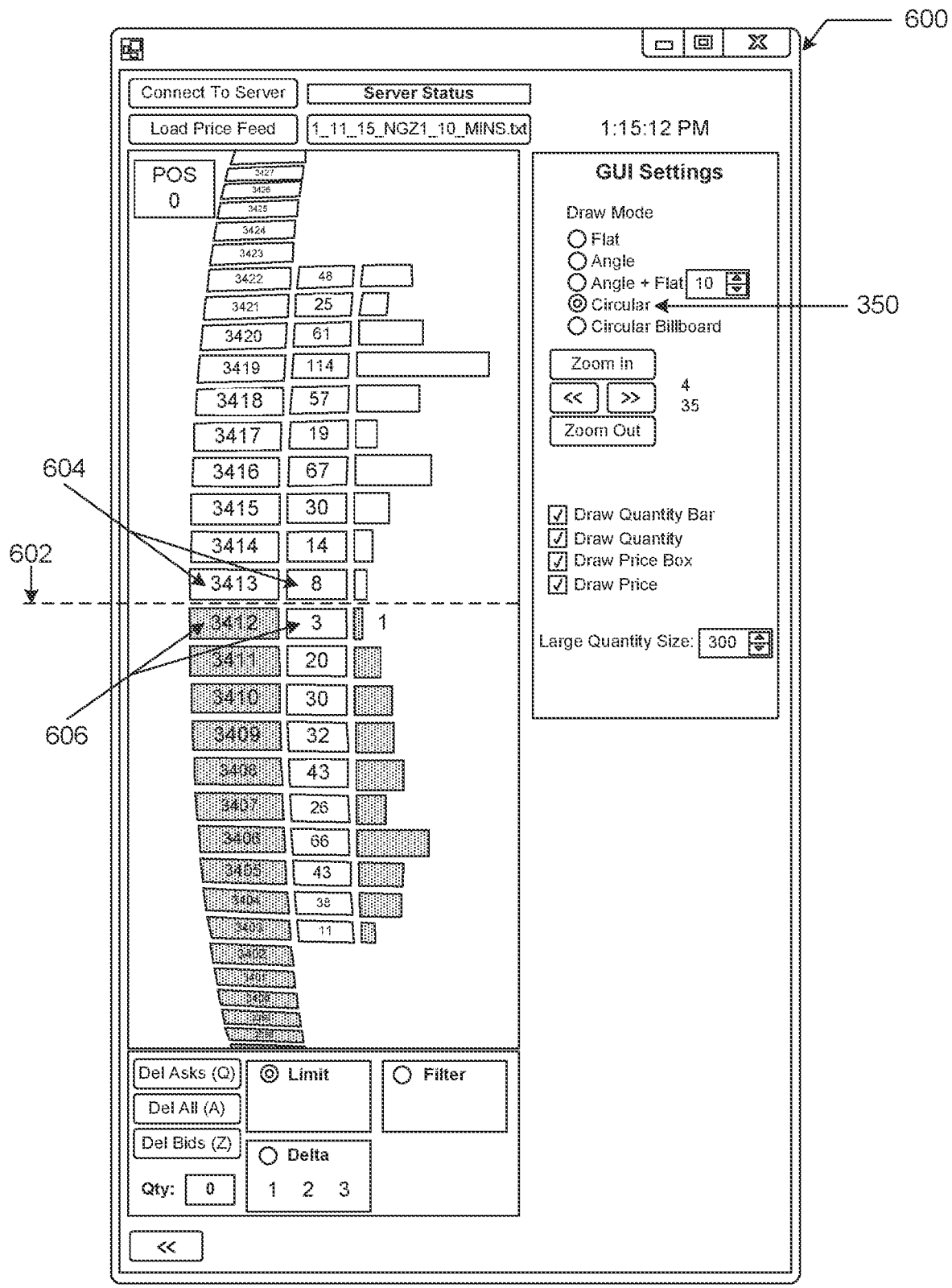
FIG. 6 is a graphical user interface that displays market data using a circular pseudo-3D perspective.

FIG. 6 is a graphical user interface (GUI) 600 capable of implementing other features of the described technology. GUI 600 is similar to GUI 300; however, in GUI 600 the circular indicator 350 is selected. When the circular indicator 350 is selected a circular dimension is applied to the market data 304, for example by mapping the market data 304 to a circular 3D object such as a wheel-like object. The center of the inside market (i.e., between the lowest sell-offer price-level-quantity pair 604 and highest buy-offer price-level-quantity pair 606) automatically adjusts to a position located proximate to a fixed axis, such as an axis 602. For example, to reflect changes (e.g., offers made, removed, and/or filled) detected in new market data, the described technology will automatically update and re-center the market data 304 by adjusting the market data 304 such that the center of the inside market automatically moves toward the axis 602. In this scenario, the moving market data 304 gives the appearance of a wheel rotating about a central axis and, as the wheel rotates, the inside market data is updated and automatically moves to re-center about a fixed axis. The axes described above may be visible or invisible. For example, when an invisible axis is used, the re-centering of the market data 304 moves toward an invisible or imagined line.

Figure 7:
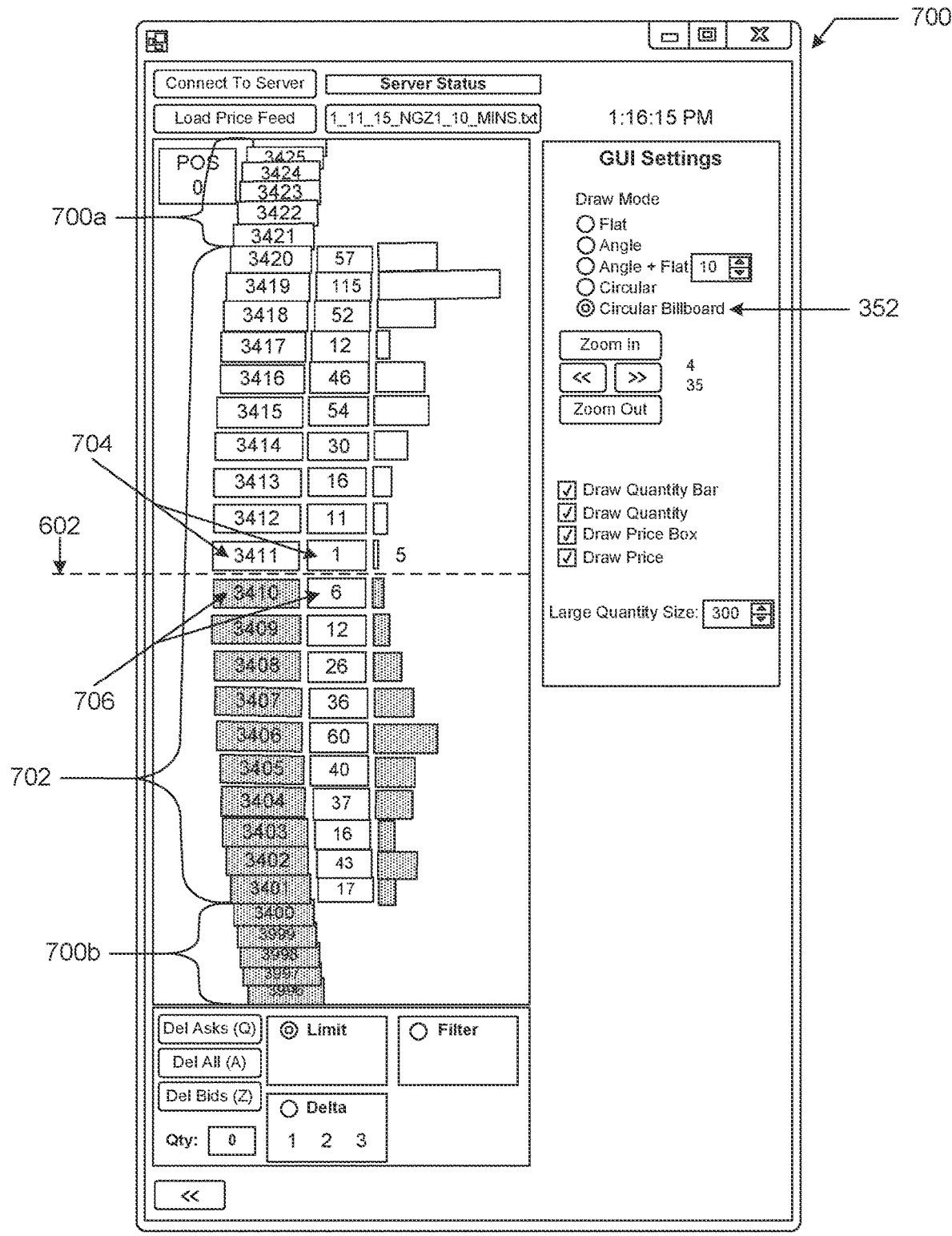
FIG. 7 is a graphical user interface that displays market data using a circular billboard pseudo-3D perspective.

FIG. 7 is a graphical user interface (GUI) 700 similar to GUI 600; however, in GUI 700 the circular billboard indicator 352 is selected. When the circular billboard indicator 352 is selected, a circular dimension is applied to the market data 304, for example by mapping the market data 304 to a circular 3D object such as a wheel-like object. In addition, the orientation of each price 700a/700b and each price-level-quantity pair 702 is upright. For example, an upright orientation can cause each price 700a/700b and each price-level-quantity pair 702 to display in the same geometric plane as the GUI 700 while maintaining an attachment between the circular 3D object and the price-levels 700a/700b and price-level-quantity pairs 702. As described above, the center of the inside market (i.e., between the lowest sell-offer price-level-quantity pair 704 and highest buy-offer price-level-quantity pair 706) automatically adjusts to a position located proximate to a fixed axis, such as the axis 602.

Figure 8:
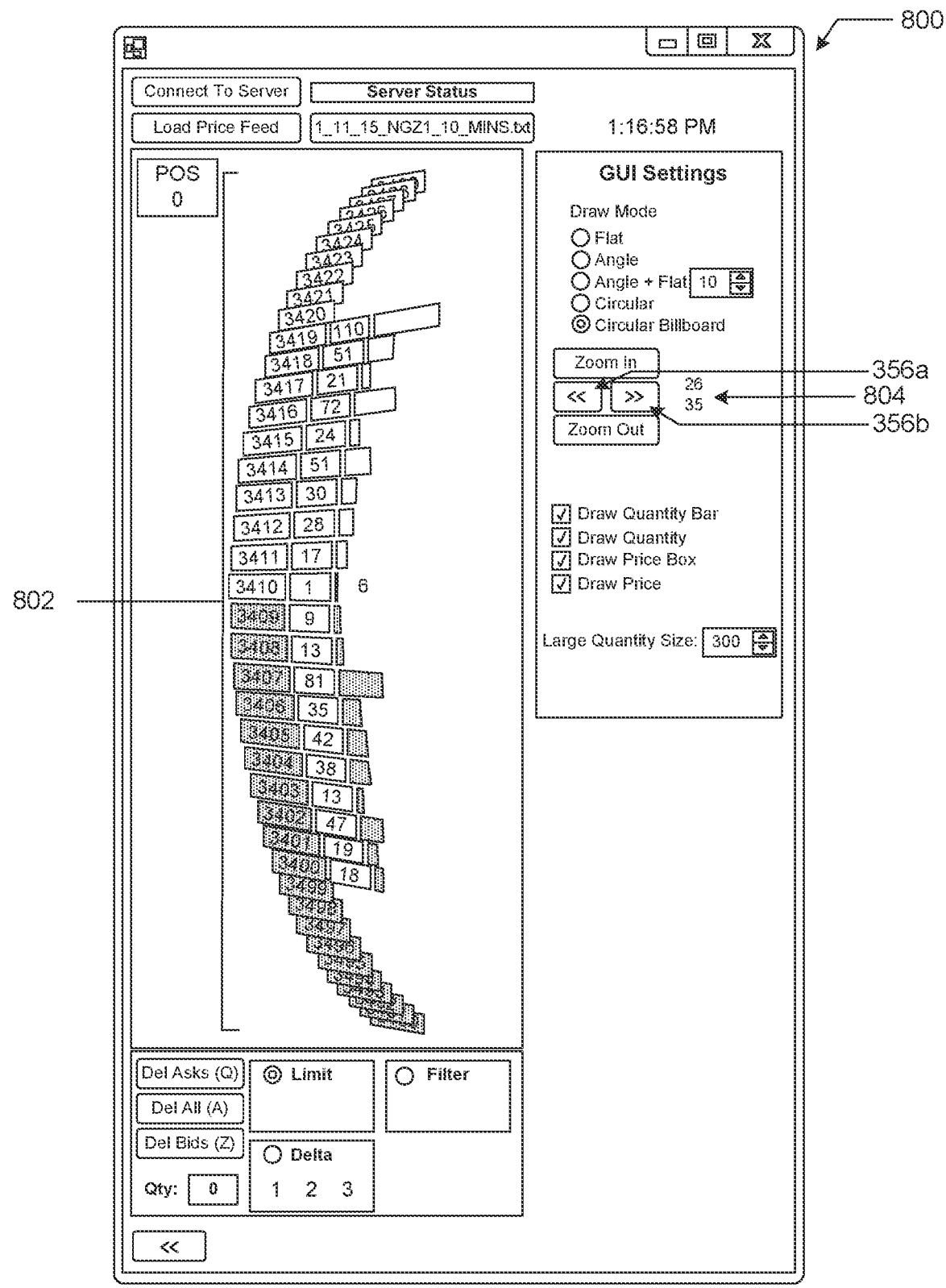
FIG. 8 is a graphical user interface that displays market data using a rotated pseudo-3D perspective.

FIG. 8 is a graphical user interface (GUI) 800 that depicts a rotated perspective of market data 802, based on the market data 304 shown in FIG. 7. GUI 800 is similar to GUI 700; however, in GUI 800 some of the features 354-356 are utilized to view a different perspective of the market data 802. The viewing perspective of the market data 802 was rotated by use of the angle indicator 356b. A perspective number 804 indicates that the viewing perspective of the market data 802 was rotated "26" units, a change from the 4 units depicted in FIG. 7.

Figure 9:
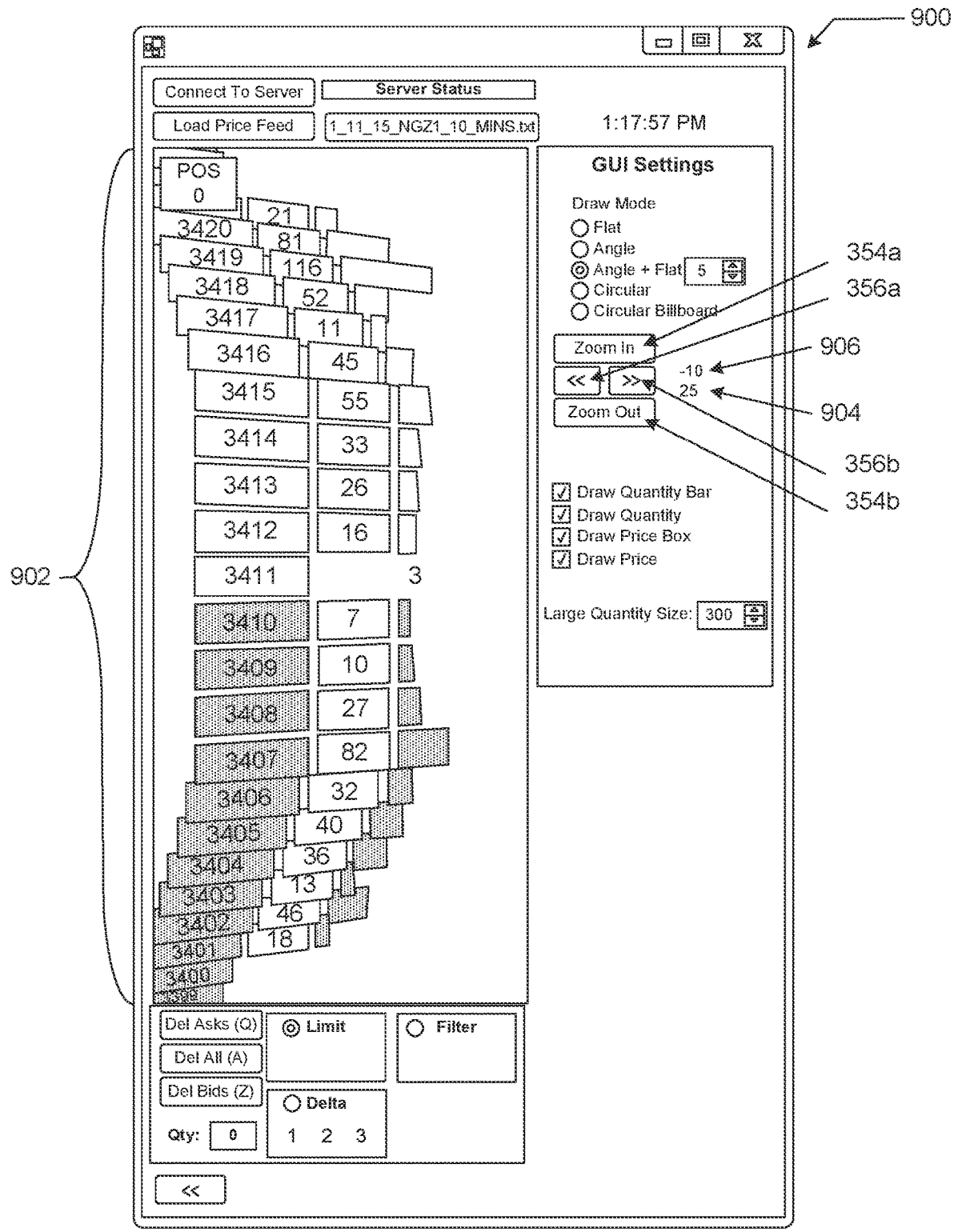
FIG. 9 is a graphical user interface that displays market data using a zoomed-in, rotated pseudo-3D perspective.

FIG. 9 is a graphical user interface (GUI) 900 that depicts a zoomed-in, rotated perspective of market data 902, based on the market data 802 shown in FIG. 8. GUI 900 is similar to GUI 800; however, in GUI 900 the viewable size of the market data 902 has been decreased by use of the zoom-in indicator 354a. The zoom number 904 indicates that the magnification of the market data 902 is "25" units, a change from the "35" unit value used in FIG. 8. Additionally, FIG. 9 depicts that the viewing perspective of the market data 902 was rotated, via the angle indicator 356a, to a perspective number 906 of "−10" units.

Figure 10:
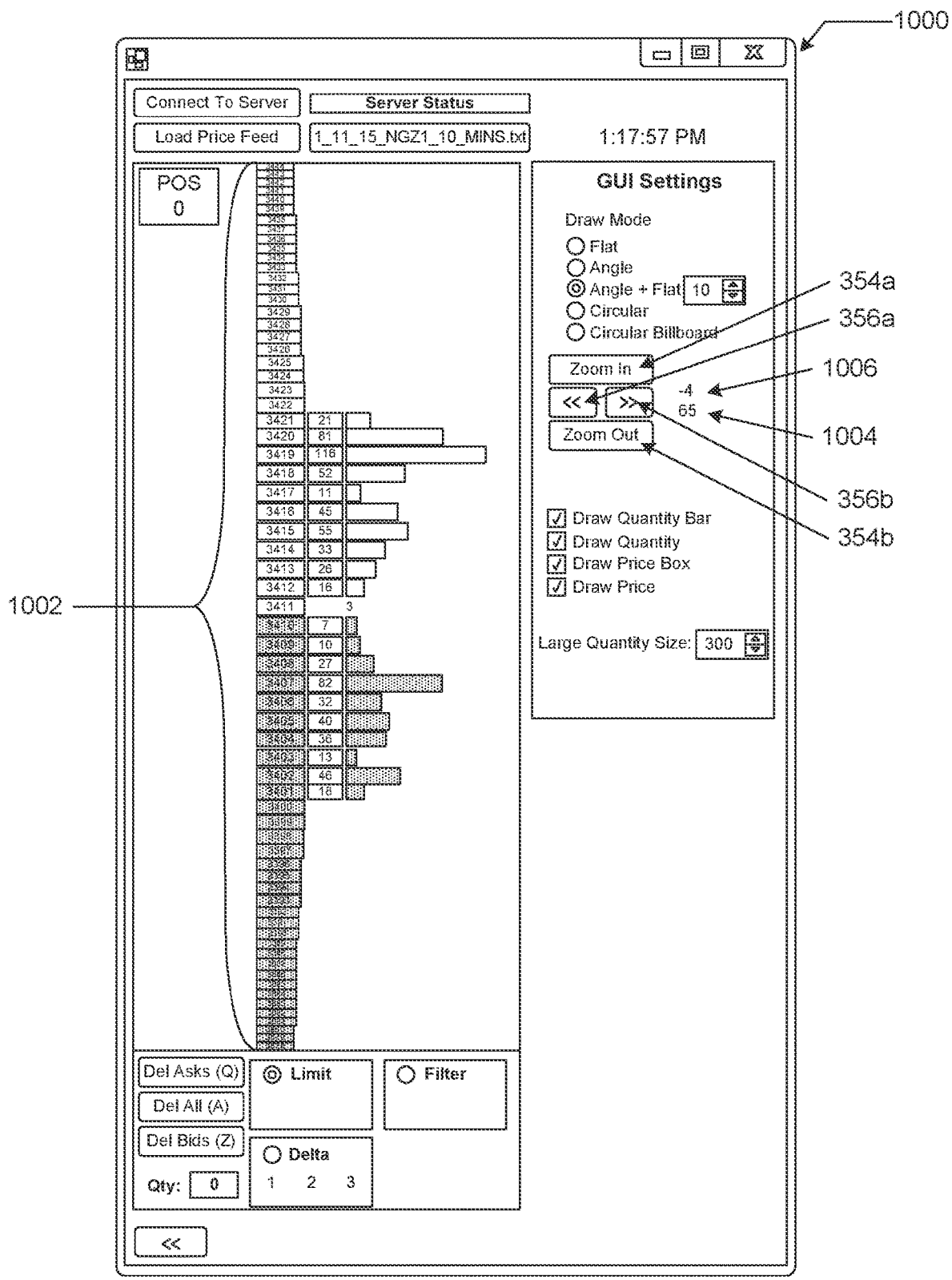
FIG. 10 is a graphical user interface that displays market data using a zoomed-out, rotated pseudo-3D perspective.

FIG. 10 is a graphical user interface (GUI) 1000 that depicts a zoomed-out, rotated perspective of market data 1002, based on the market data 902 shown in FIG. 9. GUI 1000 is similar to GUI 900; however, in GUI 1000 the viewable size of the market data 1002 has been increased by use of the Zoom-out button 354b. The zoom-number 1004 indicates that the magnification of the market data 1002 is "65" units, a change from the "25" unit value used in FIG. 9. Additionally, FIG. 10 depicts that the viewing perspective of the market data 1002 was rotated, via the angle indicator 356b, to a perspective number 1006 of "−4" units.

Other configurations of the market data and GUIs are contemplated. For example, different shapes can be applied, such as conic sections and frustums; various angles and or curves can be applied; more or less sections of a GUI can be flattened; and various other configurations can be applied.

Figure 11:
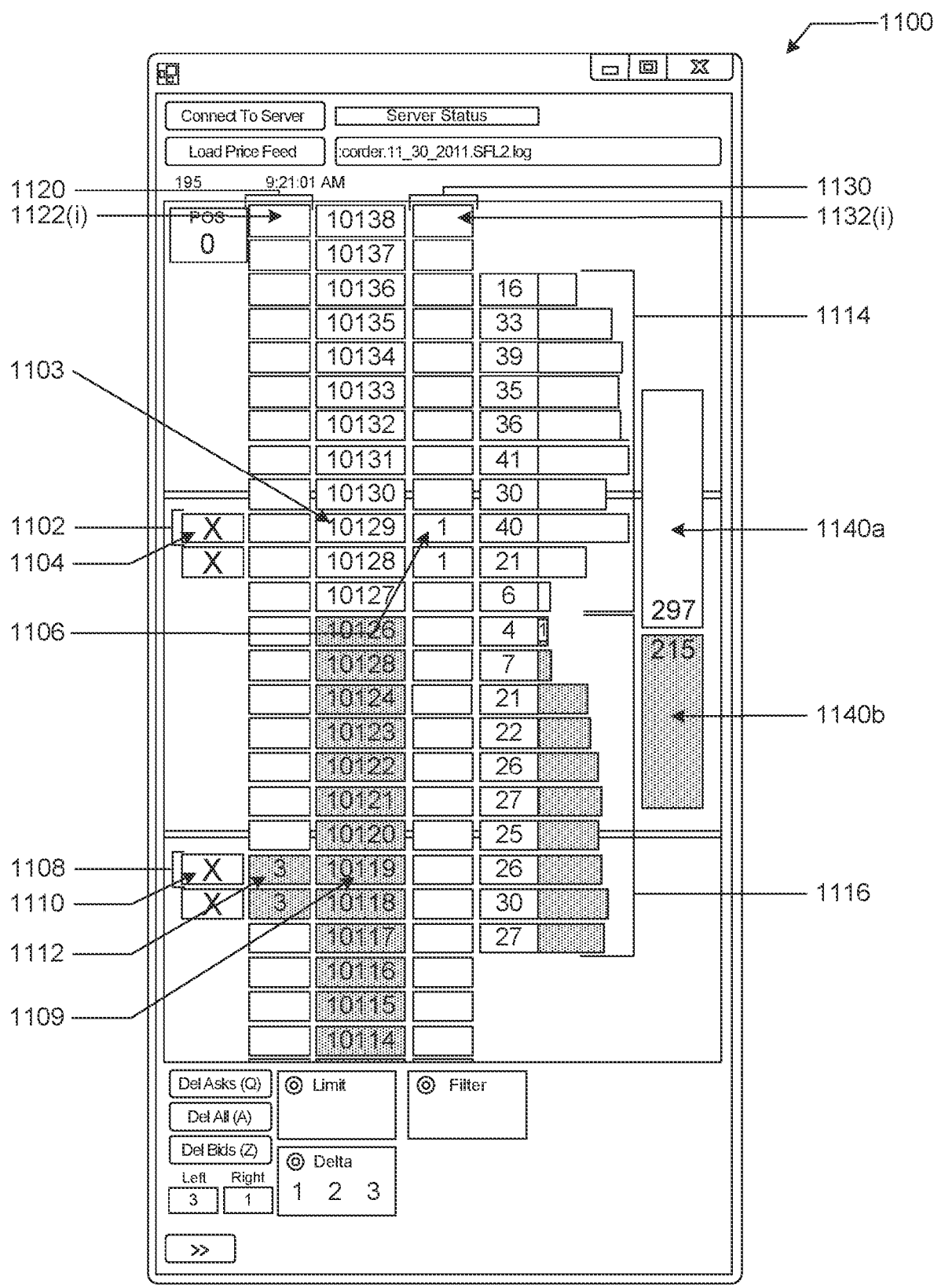
FIG. 11 is a graphical user interface capable of implementing features of the described technology, such as making and canceling offers.

FIG. 11 is a graphical user interface (GUI) 1100 capable of implementing features of the described technology, such as canceling an unfilled sell offer 1102 or canceling an unfilled buy offer 1108. A buy column 1120 consists of one or more indicators 1122(i) for displaying a number representing a quantity of securities for making a buy bid. A sell column 1130 consists of one or more indicators 1132(i) for displaying a number representing a quantity of securities for making a sell offer. An unfilled sell offer 1102 is an order made for a specific quantity of securities 1106 at a specific price 1103 that has not been filled by an interested buyer in the marketplace. An unfilled buy bid 1108 is an order made for a specific quantity of securities 1112 at a specific price 1109 that has not been filled by an interested seller in the marketplace. Unfilled orders 1102/1108 can be automatically canceled by selecting a cancellation indicator 1104/1110. For example, if the sell-based cancellation indicator "X" 1104 is selected, the single order represented by the "1" quantity of security 1112 is cancelled, such as by generating a notice of the cancellation to the marketplace. Similarly, if the buy-based cancellation indicator "X" 1110 is selected, the order to buy 3 represented by the "3" quantity of securities 1106 are cancelled. As mentioned above and as further described below, a selection can be made via a keyboard entry, mouse selection, touch-enabled screen, and/or gesture. A total-ask quantity 1140a and a total-bid quantity 1140b indicate the relative strengths of the buy-side and sell-side of the market, respectively. For example, the total-ask quantity 1150a is depicted as a graphical bar sized according to the total number of sell-based transaction numbers 1114, which total to "297." The total-bid quantity 1110b is also depicted as a graphical bar sized according to the total number of bid-based transaction numbers 1116, which total to "215."

Figure 12:
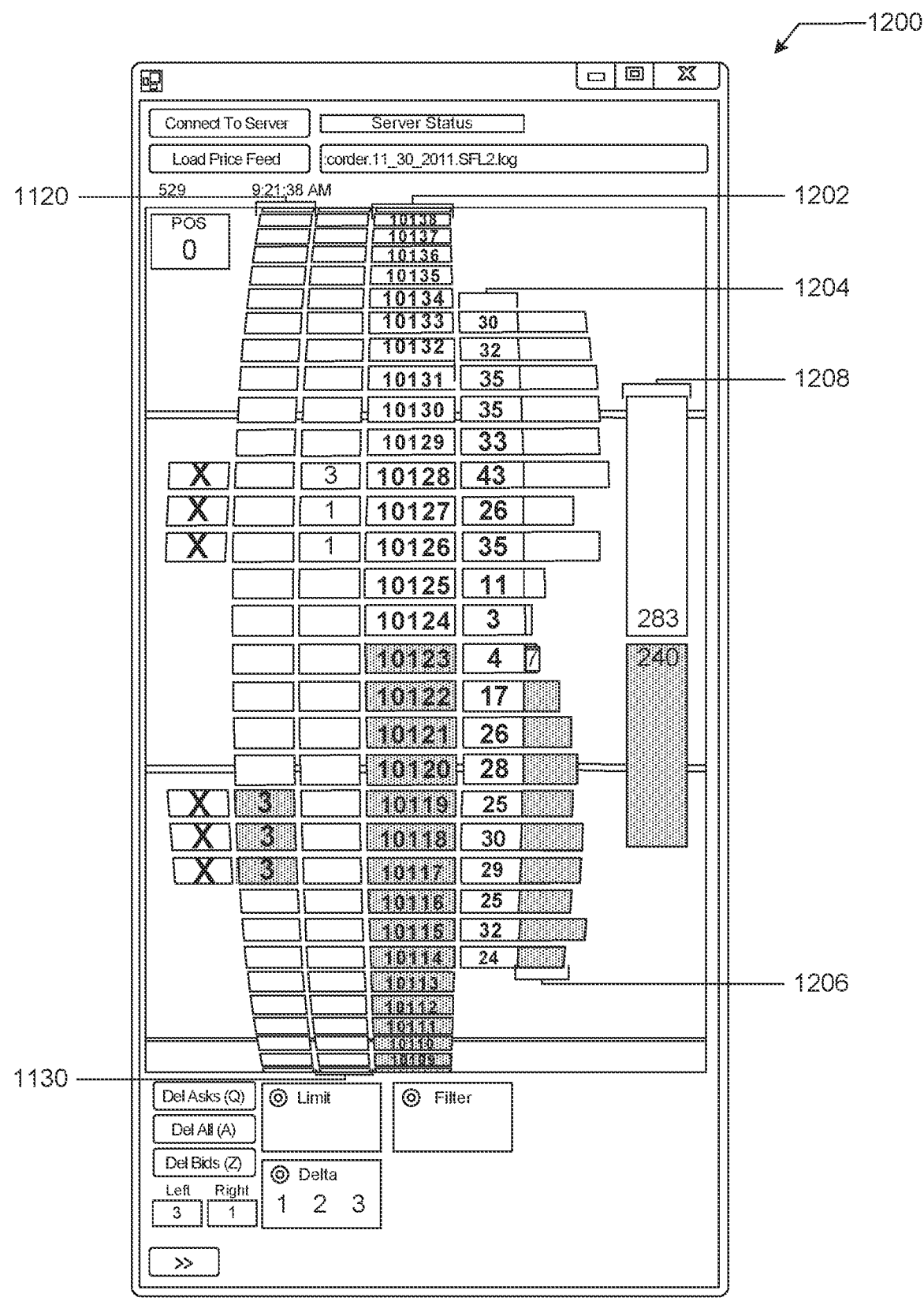
FIG. 12 is a graphical user interface where various graphical attributes have been realigned.

FIG. 12 is a graphical user interface (GUI) 1200 that depicts a pseudo-3D perspective of the market data depicted in FIG. 11; however, the sell-column 1130 has been moved to be aligned next to the buy column 1120. Each of the columns 1120, 1130, 1202, 1204, 1206, 1208 can be individually arranged on the same GUI 1200 while maintaining their 3D perspective. For example, a user can drag and drop one or more columns 1120, 1130, 1202, 1204, 1206, 1208 by selecting a particular column and moving it to a desired location of the GUI 1200. Additionally or alternatively, the GUI 1200 can automatically arrange the columns 1120, 1130, 1202, 1204, 1206, and 1208, for example based on available screen space. As further explained below, a user may move one or more of the individual columns 1120, 1130, 1202, 1204, 1206, and 1208 to separate screens where the columns may optionally maintain the pseudo-3D perspective.

B. Multi-Section Implementation

Figure 13:
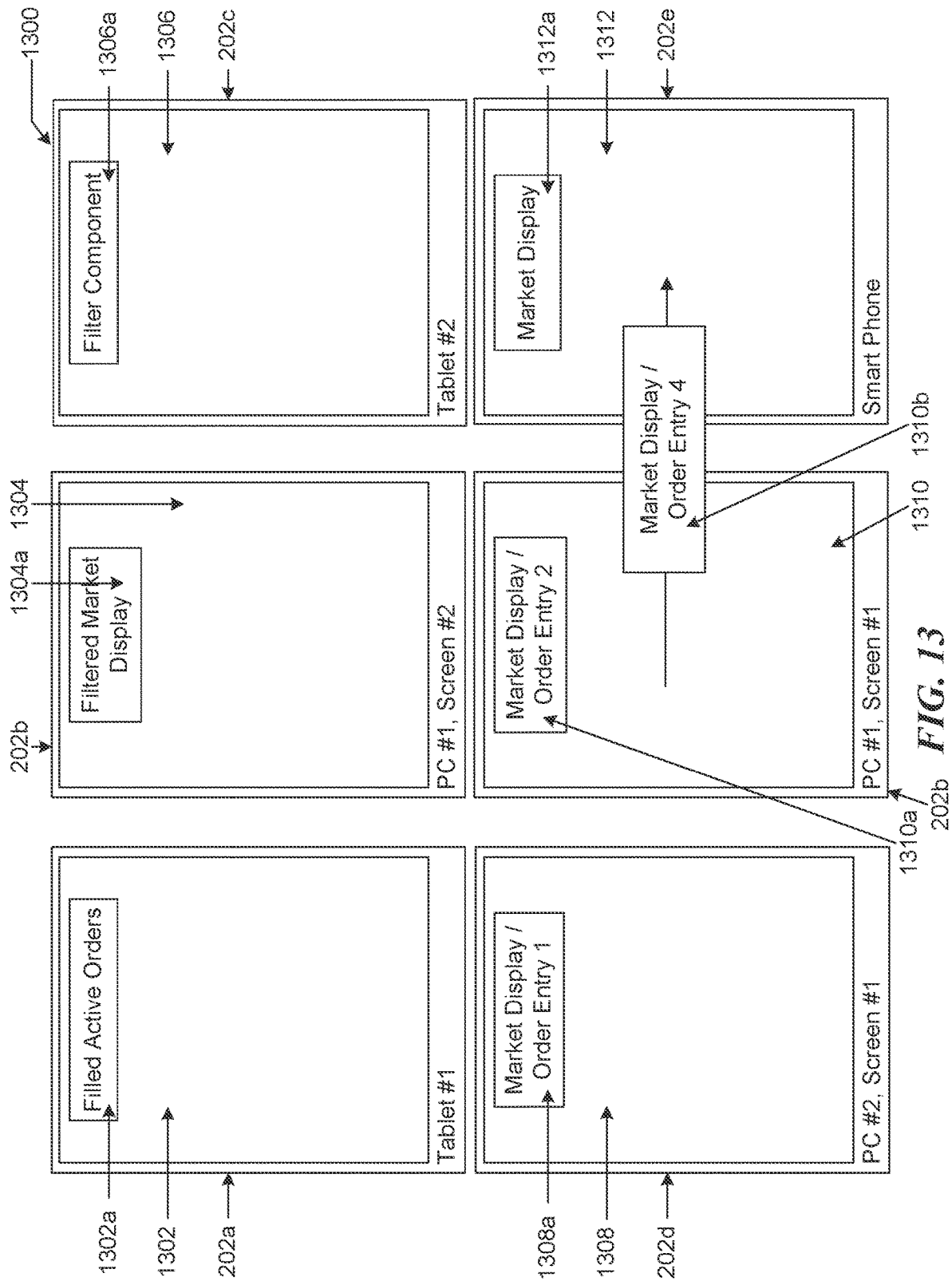
FIG. 13 is a computing environment where aspects of the described technology may be practiced using multiple computing platforms to display various aspects of the described technology.

FIG. 13 is a computing environment where aspects of the described technology may be practiced. FIG. 13 shows a distributed environment 1300 using various different types of user computers 202 (e.g., user computers 202*a-e*) to display various aspects of the GUI program component 204, such as one or more of the features (or sub-features) described for component blocks 302, 320, and 340, depicted in FIG. 3. For example, in one embodiment GUI objects 1302*a*, 1304*a*, 1306*a*, 1308*a*, 1310*a*, 1310*b*, and 1312*a* are movable objects that can be repositioned for display at one or more screens 1302-1312 associated with a corresponding user computer 202*a-e*. Each of the user computers 202*a-e* can be the same type of computer (e.g., PC, laptop, tablet, smart phone) or a different type. For example, 202*a* and 202*c* are tablet computers such as the iPad, Windows Mobile tablet, or Android-based tablet; 202*b* and 202*d* are personal computers such as a desktop or laptop; and 202*e* is a smart phone such as the iPhone, Windows Mobile smart phone, or Android smart phone. One of the user computers 202*a-e* may be a "master" computer that controls features of the other user computers 202*a-e*. For example, user computer 202*b* may be the master and the remaining user computers may be slaves. In this scenario, the master computer 202*b* may push information (e.g., GUI objects 1302*a*-1312*a*) to or from the slave computers. In another scenario, each of the user computers 202*a-e* may be "peers" where any one of the user computers 202*a-e* may push or pull information to or from the other computers 202*a-e*. Alternatively or additionally, one or more of the computer 202*a-e* may function like a dumb-terminal, where information is displayed on a screen without the necessity of having the technology required for a user to manipulate the displayed information.

For example, regardless of whether a master/slave or peer-to-peer-based scenario is used, in the examples of FIG. 13, user computer 202*b* is depicted as controlling the movement of GUI object 1310*b* from its screen 1310 to the screen 1312 at user computer 202*e* (i.e., the smart phone). Various other scenarios exist for distributing GUI objects 1302*a*-1312*a* among user computers 202*a*-202*e*. For example, FIG. 13 depicts Tablet #1 202*a* displaying "Filled Active Orders" 1302*a*; PC #1 202*b* displaying "Filtered Market Display" data at screen #2 1304 and "Market Display" and "Order Entry 2" 1310*a* at screen #1 1310; Tablet #2 202*c* displaying "Filter Component" 1306*a*; PC #2 202*d* displaying "Market Display" and "Order Entry 1" 1308*a* at screen #1 1308; and Smart Phone 202*e* displaying "Market Display" 1312*a*. Other scenarios have been contemplated, such as using only tablet devices in a master/slave scenario and/or peer-to-peer scenario; implemented the screens 1302-1312 of two or more of the user computers 202*a-e* as an extended desktop; and using web-browsers on one or more of the user computers 202*a-e* to share HTML, XML, and other documents/pages between the user computers 202*a-e* and or to other devices.

As described above, the user computers 202*a-e* are communicatively coupled using wired or wireless technology. In a scenario where any of the user computers 202*a-e* communicates using wireless technology, that user computer can be physically moved away from the other user computers 202*a-e* and still retain the same displayed information (e.g., GUI objects 1302*a*-1312*a*).

Transfer or movement of the GUI objects 1302*a*-1312*a* between user computers 202*a-e* can be automatic based on a configurable parameter, such as available screen space, data in the market data 304, or a profile that stores the placement of the GUI objects 1302*a*-1312*a* at locations on respective screens 1302-1312. Transfer or movement of the GUI objects 1302*a*-1312*a* can be manually performed based on a user selection, gesture, or other user input. For example, a user can use a mouse to grab and drop one or more GUI objects 1302*a*-1312*a*, use keys such as the arrow keys or configurable "hot" keys, or perform a gesture. A user gesture such as a "swipe" command can move a GUI object (e.g., 1310*b*) from one screen (e.g., screen 1310) to another screen (e.g., 1312).

C. Gesture-Based Trading

Figure 14:
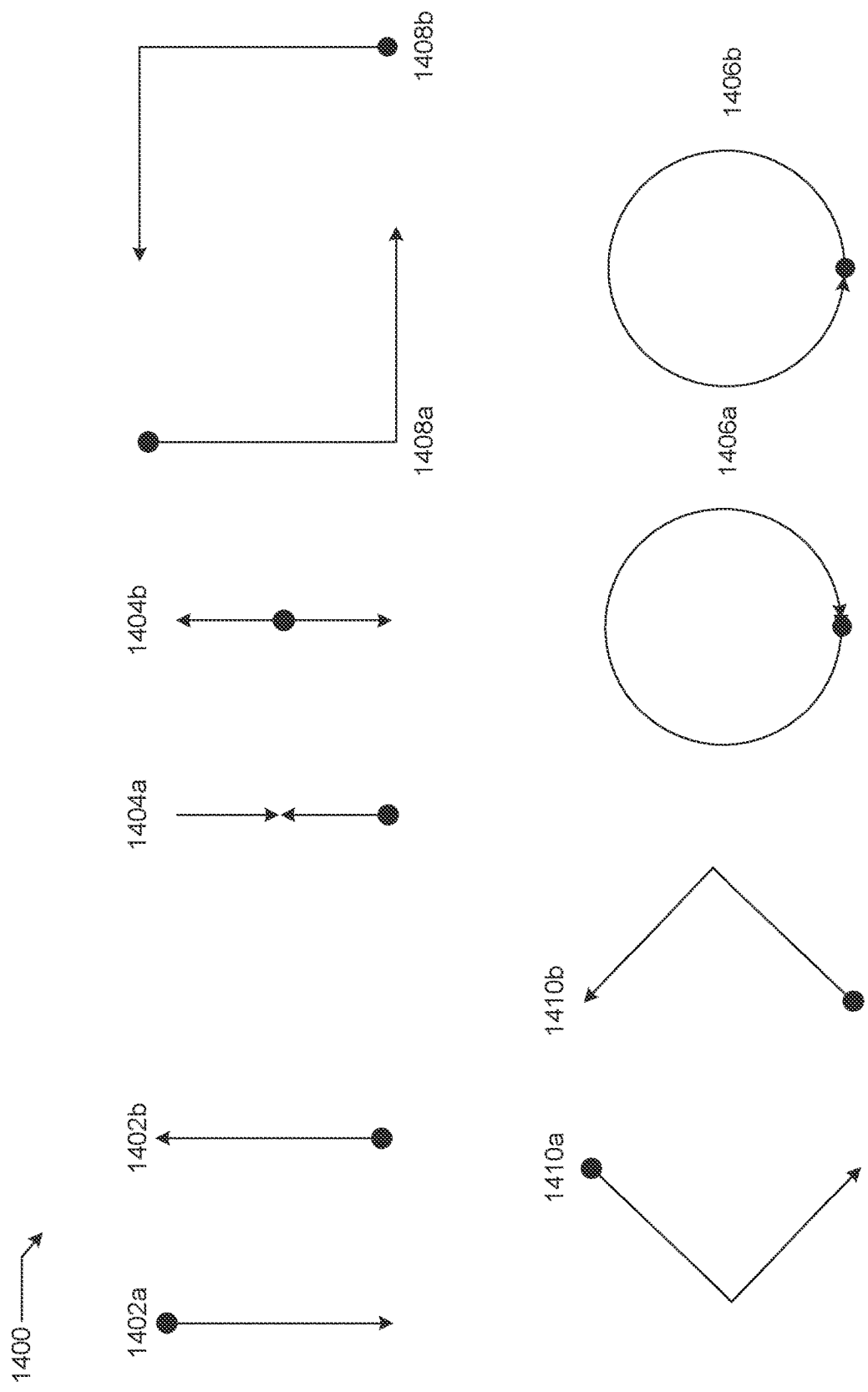
FIG. 14 depicts various user gestures that can be used with various aspects of the described technology.

FIG. 14 depicts various user gestures 1400 that can be used with various aspects of the described technology. Gestures 1402*a* and 1402*b* are straight slide gestures that slide from top to bottom 1402 and bottom to top 1402*b*. Gestures 1404*a* and 1404*b* are a pinch-to-zoom gesture 1404*a* and zoom-out gesture 1404*b*, respectively. Gestures 1406*a* and 1406*b* are circular gestures in different directions. Gestures 1408*a* and 1408*b* are gestures that implement an "L" and "1", respectively. Gestures 1410*a* and 1410*b* implement "<" and ">", respectively. Other gestures have been contemplated, for example using a combination of gestures simultaneously.

Any gesture 1402*a*-1410*b*, other gesture (not shown), or combination of gestures can be configured to generate a command. As described herein, gestures can be used for many aspects of the described technology, such as moving and interacting with component blocks 302, 320, and 340 and GUI objects 1302*a*-1312*a*; entering, removing, and interacting with offers; creating a "holding pen" of orders that represent a series of actions or a trading strategy; manipulating the speed and/or movement of the market data 304, zooming in and out of the market data 304, etc. A gesture can be position-specific such that if it is made on one area of the GUI 300/1000 a first command is generated or if made on another part of the GUI 300/1000 a second command is generated, as described above. For example, gesture 1402*a* made in the sell column 1130 can be configured to automatically sell a default or loaded quantity of offers at the best bid price-level; however, when gesture 1402*a* is made to the right of column 1130, for example, the price-levels 310(*i*) are moved downward.

D. Stop-Loss Trading

Figure 15A:
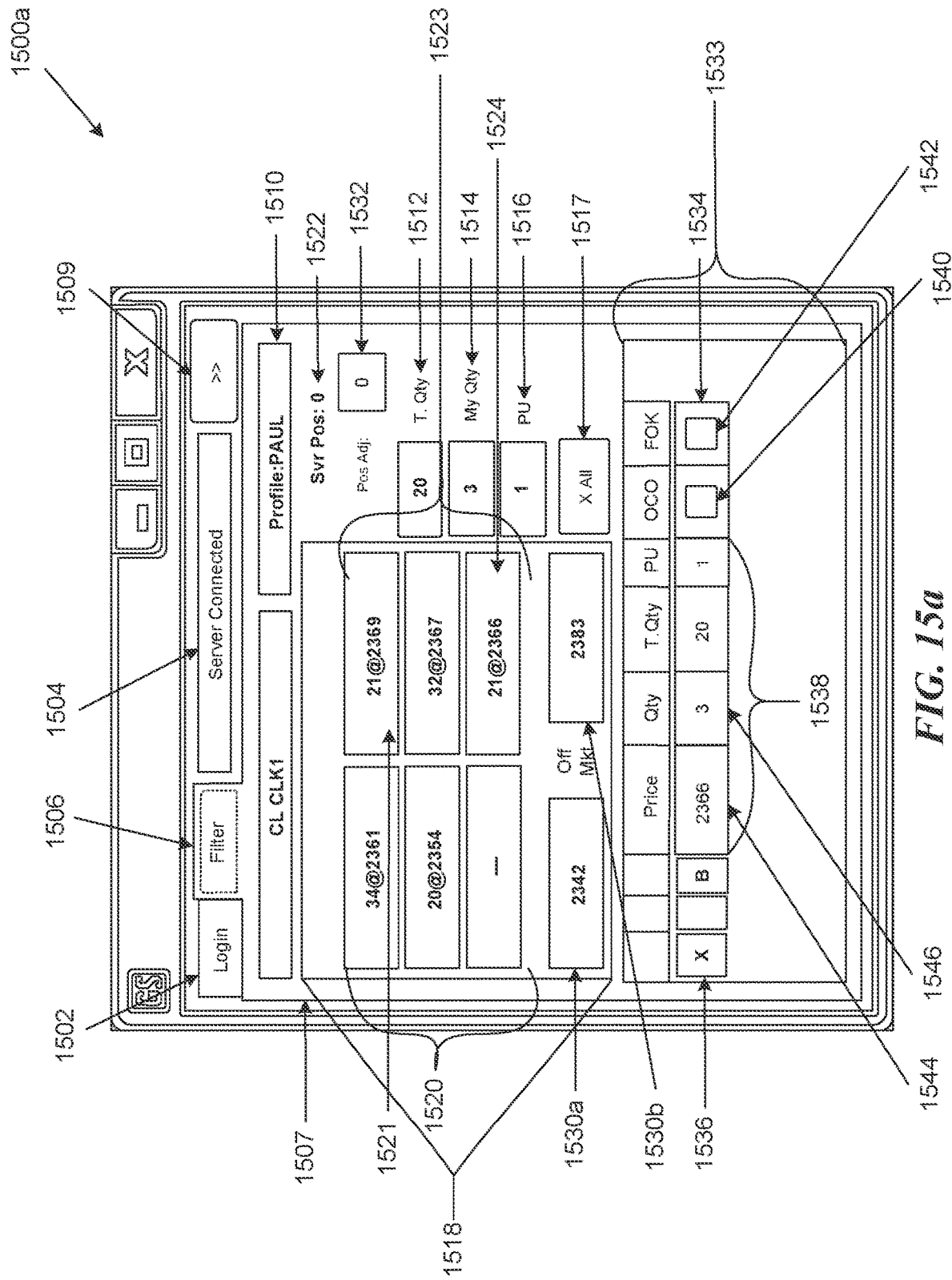
FIGS. 15*a-b* are graphical user interfaces where aspects of the described technology may be practiced, such as creating triggerable stop-loss market orders.
Figure 15B:
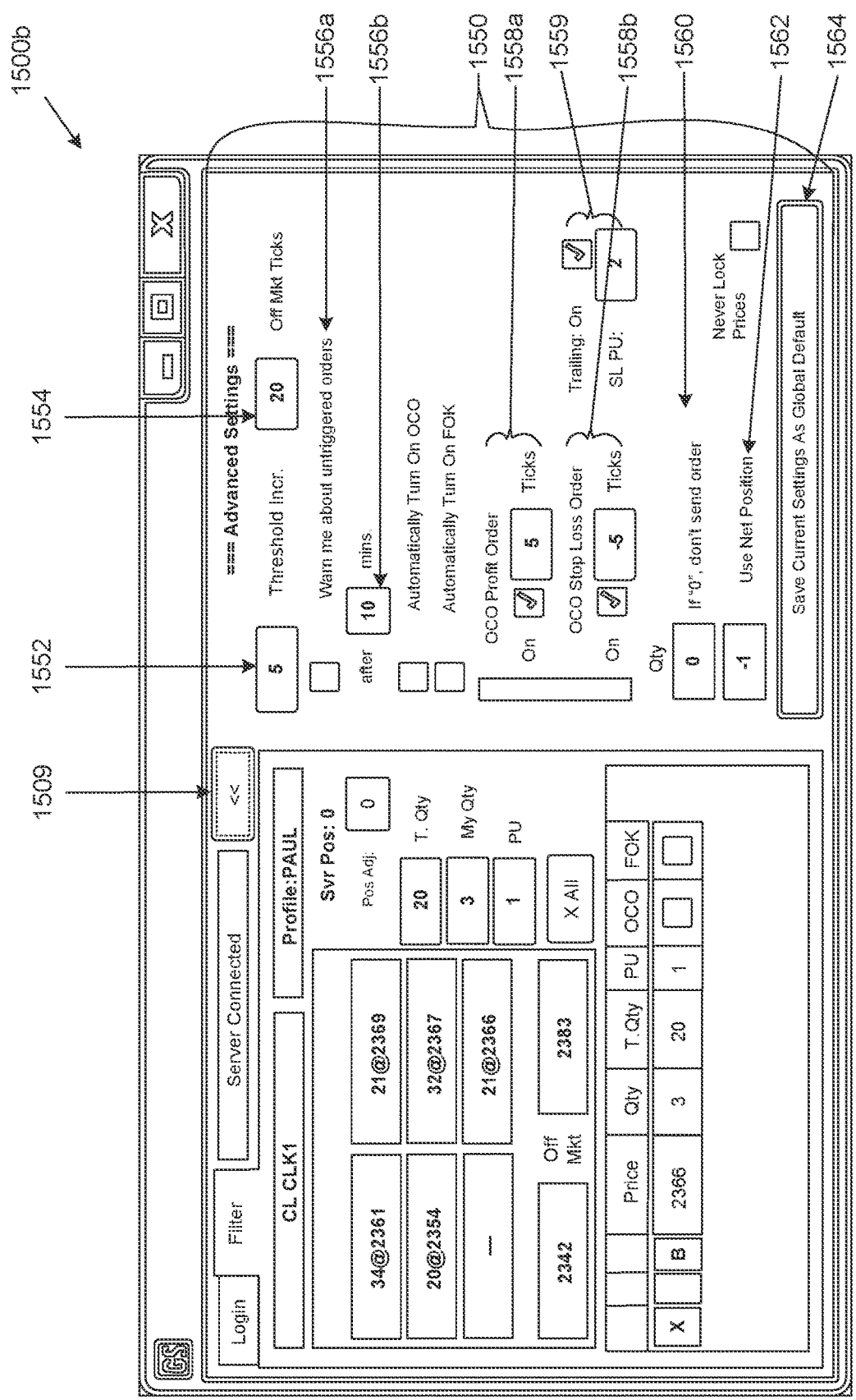

FIGS. 15*a-b* depict features of GUIs 1500*a*-1500*b* where aspects of the filter component 205 may be practiced. In one embodiment, the filter component 205 is a customizable GUI 1500*a*-1500*b* that works as a stop loss program that allows a user to configure triggerable stop-loss orders based on a threshold quantity. For example, if a best sell offer 1521 goes lower than a quantity threshold 1512, a stop order can be automatically generated for submitting to the marketplace. The objective is to beat other potential stop orders to the market or to minimize a loss by reacting to the market conditions faster than traders that are mouse-based "click traders" can. In one embodiment, the GUI 1500*a-b* can operate alongside the GUI program component 204; however, in another embodiment GUI 1500*a-b* can operate as a standalone component.

A login tab 1502 contains components of a server login screen (not shown). The user can connect user computer 202 to a server computer 208 by entering user credentials such as a username and password. The GUI 1500*a* will report "Server Connected" in the upper right hand corner 1504 upon successful login. If the logon process fails for whatever reason, the GUI 1500*a* will report an error and will be unable to create stop orders. If at any time the user computer 202 and server 208 lose connectivity, the GUI 1500*a* reports "Server Disconnected" and all known stop orders can be automatically removed. The GUI 1500*a* can be configured such that a user cannot log in unless a non-default profile is selected, as indicated in a selected profile field 1510 where user "Paul" has successful logged in. If the server side disconnects for any reason, the user will receive an alert.

A filter tab 1506, when selected, displays a stop order entry configuration panel 1507 for creating virtual stop orders 1534 (i.e., an untriggered stop order that has been configured using the filter component 205). The stop order entry configuration panel 1507 contains an automatically updating list of bids 1520 and offers 1523 from market data that meet the quantity threshold 1512. The bids 1520 and offers 1523 can be configured to automatically move, within an order display 1518, to reflect changes in the market. Moving a mouse over an order display 1518, pressing a pre-programmed key, or making a gesture can automatically pause movement on the order display 1518.

Any number of virtual orders 1534 can be created. A virtual order 1534 can contain parameters 1538. The parameters 1538 can be selected using the features of the configuration panel 1507, such as by setting a quantity threshold ("T. Qty") 1512, "My Qty" 1514, and the payup ticks ("PU") 1516. "T. Qty" 1512 is a trigger quantity that is used to determine which prices are displayed in the order display 1518. Only those prices in the order display 1518 that meet the trigger quantity 1512 are displayed. "My Qty" 1514 represents the quantity of securities to use when placing a stop order. "PU" 1516 is the number of "payup ticks" to use when sending an order. "Payup ticks" provide a maximum price parameter for the order to attempt completion upon initiation. For example, if the market is at price 10 when a buy order is triggered and "payup ticks" is set at 2, then the order will be sent to the market at a price of 12 (where the market has ticks of 1). If there are offers to sell at prices of 10, 11, or 12 at the time the order is matched at the exchange, then the order will be filled at the best available price of 12 or less. Position adjust quantity 1532 represents a value to use for updating a net position 1522 that is used to flatten a trader's position.

Virtual orders 1534 can be created in various ways, for example using gestures, touch screen-based devices, or standard input devices, such as a mouse and/or keyboard. For example, clicking on one of the bids 1520 or offers 1523 in the order display 1518 will automatically create a limit order 1534 at the price associated for the selected bid or offer, respectively. Virtual orders 1534 could be created, for example, by selecting one or more of the desired parameters 1512-1516 and selecting a sell offer button 1524 (e.g., 21@2366). The "Off Mkt" buttons 1530*a-b* are used to enter orders off of the market prices, as is known in the art.

A grid view 1533 contains one or more virtual stop orders 1534. A virtual order 1534 is automatically cancelled and removed from the grid view 1533 after it has been triggered, as explained below. A virtual order is manually canceled by selecting a cancel indicator 1536 (e.g., by selecting the "X" button). All virtual orders are simultaneously canceled by selecting a kill all button 1517 (e.g., by selecting the "X" button). All of the parameters 1538 are manually configurable (e.g., by using left or right mouse clicks to change the values up or down or by using keyboard entries or gestures). A fill-or-kill ("FOK") mode 1542, when selected, will automatically cancel a triggered virtual order 1534 if it is not immediately filled. OCO 1540 mode is explained below.

The filter component 205 and/or GUI program component 204 can monitor market data (e.g., market data 220) for information that matches the parameters of a virtual stop order 1534. When the T. Qty 1512 is met at the chosen price level, an order (e.g., the virtual stop order 1534) is sent for delivery to the exchange. For example, virtual order 1534 would be triggered at trigger quantity 1546 and price 1544. A response message can be delivered to the user computer 202 in response to the order, resulting in the removal of the virtual stop order 1534 from the grid view 1533. The expansion selector 1509, when selected, automatically expands the user interface to show advance settings, as depicted in FIG. 15*b*.

FIG. 15*b* is a user interface showing advance settings 1550 with additional options for configuring the filter component 205. The advance settings 1550 may be automatically accessible to a user or accessible to a user via an expansion selector 1509.

A threshold Increment 1552 is the increment that will control how fast the T. Qty 1512 moves. For example, a trader may set this value to 5 so that the trader can quickly adjust the T. Qty 1512 by 5 units at a time (e.g., 5, 10, 15, 20, 25, etc.). Warning 1556*a*, when selected, warns a trader of untriggered orders. For example, if a virtual order 1534 has been untriggered for a configurable amount of time 1556*b*, then a warning will be sent for delivery to the trader.

One-cancels-the-other ("OCO") mode 1540 includes a profit order mode 1558*a* and/or stop loss order mode 1558*b* that, if selected, causes a profit order and a stop loss order, respectively, to be automatically generated and sent to the exchange (directly, or indirectly via GUI program component 204) upon the triggering and fulfilling of a virtual order 1534. The number of ticks for each OCO order is configurable and a trailing stop mode 1559 can be set to follow the last traded price. For example, if both a profit order and a stop order are sent to the marketplace and one of the two orders is filled, selecting OCO mode 1540 will cause the generation of a cancel order canceling the other order.

If a Qty 1560 of an order is set to zero (i.e., a zero order score), the order is still triggerable and can behave like an order with a positive quantity; however, a zero quantity order is not sent to the GUI program component 204. This may be useful, for example, when testing a strategy before implementation. If the Qty 1562 of the order is set to "−1" the order will use the Net Position value 1562 as the quantity. For example, if an order (e.g., virtual stop order 1534 from the grid view 1533) has a positive quantity that would result in a position that would make the order further long or short, the order will optionally not be sent. Instead, the order will be generated to attempt to flatten the trader's position by using the Net Position value 1562. This value can be adjusted using the position adjust quantity 1532.

A save settings indicator 1564, when selected, will save the current settings to a configuration file and/or database that may be automatically used for subsequent uses of the filter component 205.

E. Conclusion

In general, the detailed description of embodiments of the described technology is not intended to be exhaustive or to limit the technology to the precise form disclosed above. While specific embodiments of, and examples for, the technology are described above for illustrative purposes, various equivalent modifications are possible within the scope of the described technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the described technology provided herein can be applied to other systems, not necessarily the system described herein. The elements and acts of the various embodiments described herein can be combined to provide further embodiments.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

These and other changes can be made to the described technology in light of the above Detailed Description. While the above description details certain embodiments of the technology and describes the best mode contemplated, no matter how detailed the above appears in text, the described technology can be practiced in many ways. The described technology may vary considerably in its implementation details, while still being encompassed by the technology disclosed herein. As noted above, particular terminology used when describing certain features or aspects of the described technology should not be taken to imply that the terminology is being redefined herein to be restricted to any specific characteristics, features, or aspects of the technology with which that terminology is associated. In general, the terms used in the following claims should not be construed to limit the described technology to the specific embodiments disclosed in the specification, unless the above Detailed Description section explicitly defines such terms. Accordingly, the actual scope of the described technology encompasses not only the disclosed embodiments, but also all equivalent ways of practicing or implementing the described technology.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, 16 will begin with the words "means for", but use of the term "for" in any other context is not intended to invoke treatment under 35 U.S.C. § 112, 16.) Accordingly, the applicant reserves the right to pursue additional claims after filing this application to pursue such additional claim forms, in either this application or in a continuing application.

We claim:

1. At least one computer-readable medium, excluding transitory signals, and carrying instructions configured to cause at least one processor to perform operations for taking one or more actions based on detecting a triggering event in market trading information, the operations comprising:
   with a user device comprising a touchscreen, generating and causing the user device to display a graphical user interface (GUI) comprising a touch-responsive control;
   displaying, via the GUI, a filter component comprising an executable structured to generate a particular virtual order and trigger, upon occurrence of a triggering event, a market order based on the particular virtual order;
   receiving an indication of a single user gesture to the GUI via the touch-responsive control; and
   in response to receiving the indication of the single user gesture, automatically:
      generating a parameter for the particular virtual order, wherein the parameter corresponds to the single user gesture;
      generating, via the filter component, the particular virtual order using the generated parameter for the particular virtual order and storing the particular virtual order in a computer memory,
         wherein the parameter of the particular virtual order defines the triggering event which, when detected in market trading information, triggers an action;
      processing market trading data with the filter component;
      detecting, in the processed market trading data and using the filter component, market data indicative of an occurrence of the triggering event; and
      in response to detecting the market data indicative of the triggering event, automatically triggering, via the filter component, the action, wherein triggering the action includes:
         causing the user device to present, on the GUI, an alert indicative of the triggering event;

converting the particular virtual order to the market order; and
causing execution of the market order in accordance with the filter component,
wherein the filter component controls when and how the market order is submitted and a type of market order that is submitted.

2. The at least one computer-readable medium of claim 1, wherein the operations further comprise:
setting, based on additional user input to the user device, a set of filter criteria for the filter component,
wherein each criterion in the set of filter criteria is associated with a characteristic of a bid or ask; and
causing display, on the GUI and based on the set of filter criteria, of a portion of the processed market trading data that satisfies the set of filter criteria;
wherein configuring the particular virtual order includes setting, based on the single user gesture to the user device, a selection of at least one bid or at least one ask from the displayed portion of the processed market trading data.

3. The at least one computer-readable medium of claim 1, wherein the operations further comprise:
setting, based on additional user input to the user device, a set of filter criteria for the filter component,
wherein each criterion in the set of filter criteria is associated with a characteristic of a bid or ask; and
causing display, on the GUI and based on the set of filter criteria, of a portion of the processed market trading data that satisfies the set of filter criteria.

4. The at least one computer-readable medium of claim 1, wherein the particular virtual order includes a stop-loss order based on a threshold quantity, a one-cancels-the-other order, or a fill-or-kill order.

5. The at least one computer-readable medium of claim 1, wherein the particular virtual order includes parameters for at least one of timing, type, or manner of submitting the market order based on the particular virtual order, and wherein the particular virtual order includes a number of payup ticks.

6. The at least one computer-readable medium of claim 1, wherein the triggering event includes an appearance of a price in an inside market level, the operations further comprising:
canceling, in response to automatically triggering the action, the particular virtual order.

7. The at least one computer-readable medium of claim 1, wherein the triggering event includes a preconfigured order scenario, and wherein the alert for the user device includes a request to confirm entry of the market order by one of a mouse click, a button actuation, or a gesture.

8. The at least one computer-readable medium of claim 1, wherein detecting the occurrence of the triggering event further includes detecting at least one pattern in the processed market trading data, and wherein the at least one pattern includes an iceberg order.

9. A computer-implemented method of automatically taking actions based on detecting a triggering event in market trading information, the method comprising:
with a user device comprising a touchscreen, generating and causing the user device to display a graphical user interface (GUI) comprising a touch-responsive control;
displaying, via the GUI, a filter component comprising an executable structured to generate a particular virtual order and trigger, upon occurrence of a triggering event, a market order based on the particular virtual order;
receiving an indication of single user gesture to the GUI via the touch-responsive control; and
in response to receiving the indication of the single user gesture, automatically:
generating a parameter for the particular virtual order, wherein the parameter corresponds to the single user gesture;
generating, via the filter component, the particular virtual order using the generated parameter for the particular virtual order and storing the particular virtual order in a computer memory,
wherein the parameter of the particular virtual order defines the triggering event which, when detected in market trading information, triggers an action;
processing market trading data with the filter component;
detecting, in the processed market trading data and using the filter component, market data indicative of an occurrence of the triggering event; and
in response to detecting the market data indicative of the triggering event, automatically triggering, via the filter component, the action, wherein triggering the action includes:
causing the user device to present, on the GUI, an alert indicative of the triggering event; and
generating the market order based on the particular virtual order, or
causing submission of the market order.

10. The computer-implemented method of claim 9, further comprising:
setting, based on additional user input to the user device, a set of filter criteria for the filter component,
wherein each criterion in the set of filter criteria is associated with a characteristic of a bid or ask; and
causing display, on the GUI and based on the set of filter criteria, of a portion of the processed market trading data that satisfies the set of filter criteria;
wherein configuring the particular virtual order includes setting, based on the single user gesture to the user device, a selection of at least one bid or at least one ask from the displayed portion of the processed market trading data.

11. The computer-implemented method of claim 9, further comprising:
setting, based on additional user input to the user device, a set of filter criteria for the filter component,
wherein each criterion in the set of filter criteria is associated with a characteristic of a bid or ask; and
causing display, on the GUI and based on the set of filter criteria, of a portion of the processed market trading data that satisfies the set of filter criteria.

12. The computer-implemented method of claim 9, wherein the particular virtual order includes a stop-loss order based on a threshold quantity, a one-cancels-the-other order, or a fill-or-kill order.

13. The computer-implemented method of claim 9, wherein the particular virtual order includes parameters for at least one of timing, type, or manner of submitting the market order to a marketplace based on the particular virtual order.

14. The computer-implemented method of claim 9, wherein the triggering event includes an appearance of a price in an inside market level.

15. The computer-implemented method of claim 9, wherein the triggering event includes a preconfigured order scenario.

16. The computer-implemented method of claim 9, wherein detecting the occurrence of the triggering event includes detecting at least one pattern in the processed market trading data.

17. A computing system, comprising:
 a user device comprising a touchscreen;
 at least one hardware processor; and
 at least one memory, excluding transitory signals, carrying instructions that, when executed by the at least one hardware processor, cause the computing system to perform operations, comprising:
  generating and causing the user device to display a graphical user interface (GUI) comprising a touch-responsive control;
  displaying, via the GUI, a filter component comprising an executable structured to generate a particular virtual order and trigger, upon occurrence of a triggering event, a market order based on the particular virtual order;
  receiving an indication of single user gesture the GUI via the touch-responsive control; and
  in response to receiving the indication of the single user gesture, automatically:
   generating a parameter for the particular virtual order, wherein the parameter corresponds to the single user gesture;
   generating, via the filter component, the particular virtual order using the generated parameter for the particular virtual order and storing the particular virtual order in a computer memory, wherein the parameter of the particular virtual order defines the triggering event which, when detected in market trading information, triggers an action;
   processing market trading data with the filter component;
   detecting, in the received market trading information and using the filter component, market data indicative of an occurrence of the triggering event; and
   in response to detecting the market data indicative of the triggering event, automatically triggering, via the filter component, the action, wherein triggering the action includes:
    causing the user device to present, on the GUI, an alert indicative of the triggering event; and
    generating the market order based on the particular virtual order, or causing submission of the market order.

18. The computing system of claim 17, wherein the particular virtual order includes a stop-loss order based on a threshold quantity, a one-cancels-the-other order, or a fill-or-kill order.

19. The computing system of claim 17, wherein the particular virtual order includes parameters for at least one of timing, type, or manner of submitting the market order based on the particular virtual order.

20. The computing system of claim 17, wherein the triggering event includes an appearance of a price in an inside market level.

\* \* \* \* \*

UNITED STATES PATENT AND TRADEMARK OFFICE
CERTIFICATE OF CORRECTION

PATENT NO. : 12,067,618 B2
APPLICATION NO. : 17/174556
DATED : August 20, 2024
INVENTOR(S) : Robert S. Creamer et al.

It is certified that error appears in the above-identified patent and that said Letters Patent is hereby corrected as shown below:

On the Title Page

On the page 2, in Column 1, under Item (56), in "U.S. PATENT DOCUMENTS", Line 18, after "Tully" insert -- et al. --.

On the page 2, in Column 1, under Item (56), in "U.S. PATENT DOCUMENTS", Line 21, after "Waelbroeck" insert -- et al. --.

On the page 2, in Column 1, under Item (56), in "U.S. PATENT DOCUMENTS", Line 27, after "Dhodapkar" insert -- et al. --.

On the page 2, in Column 1, under Item (56), in "U.S. PATENT DOCUMENTS", Line 32, after "Sandhu" insert -- et al. --.

On the page 2, in Column 1, under Item (56), in "U.S. PATENT DOCUMENTS", Line 39, after "Mayle" insert -- et al. --.

On the page 2, in Column 1, under Item (56), in "U.S. PATENT DOCUMENTS", Line 42, after "Mather" insert -- et al. --.

On the page 2, in Column 1, under Item (56), in "U.S. PATENT DOCUMENTS", Line 46, after "Hunt" insert -- et al. --.

On the page 2, in Column 1, under Item (56), in "U.S. PATENT DOCUMENTS", Line 53, after "Lutnick" insert -- et al. --.

On the page 2, in Column 1, under Item (56), in "U.S. PATENT DOCUMENTS", Line 57, after "Rosenthal" insert -- et al. --.

Signed and Sealed this
Twelfth Day of November, 2024

Katherine Kelly Vidal
*Director of the United States Patent and Trademark Office*

CERTIFICATE OF CORRECTION (continued)
U.S. Pat. No. 12,067,618 B2

On the page 2, in Column 2, under Item (56), in "U.S. PATENT DOCUMENTS", Line 7, after "Herz" insert -- et al. --.

On the page 2, in Column 2, under Item (56), in "U.S. PATENT DOCUMENTS", Line 10, after "Malatesta" insert -- et al. --.

On the page 2, in Column 2, under Item (56), in "U.S. PATENT DOCUMENTS", Line 20, delete "Celia" and insert -- Cella et al. --.

On the page 2, in Column 2, under Item (56), in "U.S. PATENT DOCUMENTS", Line 23, delete "Celia" and insert -- Cella et al. --.

On the page 2, in Column 2, under Item (56), in "U.S. PATENT DOCUMENTS", Line 26, delete "Mitchell" and insert -- Mitchell et al. --.

On the page 2, in Column 2, under Item (56), in "U.S. PATENT DOCUMENTS", Line 27, delete "Egorov" and insert -- Egorov et al. --.

On the page 2, in Column 2, under Item (56), in "Other Publications", Line 31, delete "managment" and insert -- management --.

In the Specification

In Column 16, Line 28, delete "and or" and insert -- and/or --.

In Column 18, Line 3, delete "and or" and insert -- and/or --.

In Column 18, Line 37, delete ""1"," and insert -- "¬", --.

In Column 22, Line 22, delete "16" and insert -- ¶6 --.

In Column 22, Line 24, delete "16.)" and insert -- ¶6.) --.